United States Patent
Schlangen et al.

(10) Patent No.: US 10,945,133 B2
(45) Date of Patent: Mar. 9, 2021

(54) SYSTEMS AND METHODS FOR ALLOCATING WIRELESS CHANNEL/S TO WIRELESS ACCESS POINT/S

(71) Applicant: RELIANCE JIO INFOCOMM LIMITED, Mumbai (IN)

(72) Inventors: Thomas John Schlangen, Mumbai (IN); Ajay Kumar Gupta, Bavdhan Pune (MH); Vishal Vasant Oak, Bangalore (IN); Abhishek Jain, Navi Mumbai (IN); Mahesh Nayaka Mysore Annaiah, Begaluru (IN); Tareq Amin, Mumbai (MH)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/396,910

(22) Filed: Apr. 29, 2019

(65) Prior Publication Data

US 2019/0335335 A1 Oct. 31, 2019

(30) Foreign Application Priority Data

Apr. 27, 2018 (IN) .............................. 201821015984

(51) Int. Cl.
*H04W 16/10* (2009.01)
*H04W 48/16* (2009.01)
(Continued)

(52) U.S. Cl.
CPC .......... *H04W 16/10* (2013.01); *H04B 17/318* (2015.01); *H04W 16/06* (2013.01);
(Continued)

(58) Field of Classification Search
CPC . H04W 72/0453; H04W 16/10; H04W 24/02; H04W 52/245; H04W 16/06;
(Continued)

(56) References Cited

U.S. PATENT DOCUMENTS

2007/0025310 A1* 2/2007 Weng .................. H04W 72/085
370/338
2009/0257380 A1* 10/2009 Meier ................. H04W 72/082
370/329

(Continued)

*Primary Examiner* — Oussama Roudani
(74) *Attorney, Agent, or Firm* — Hunton Andrews Kurth LLP

(57) ABSTRACT

Systems [100A/100B] and methods [700/800] for allocating wireless channel/s to wireless access point/s [102] are disclosed. More particularly, the embodiments of the present invention comprise steps of: determining at least one candidate wireless channel, providing an initial score to each of the at least one candidate wireless channel, determining a channel overlapping parameter and a signal strength factor, determining a channel score based on the initial score, the channel overlapping parameter, the signal strength factor and a reduction weight, applying a positive offset to update the channel score of each of the at least one candidate wireless channel, selecting the at least one wireless channel for the at least one wireless access point [102A] based on the updated channel score, and allocating the at least one wireless channel to the at least one wireless access point [102A].

16 Claims, 8 Drawing Sheets

(51) Int. Cl.
*H04W 16/06* (2009.01)
*H04B 17/318* (2015.01)
*H04W 52/24* (2009.01)
*H04W 52/36* (2009.01)
*H04W 72/04* (2009.01)

(52) U.S. Cl.
CPC ......... *H04W 48/16* (2013.01); *H04W 52/245* (2013.01); *H04W 52/367* (2013.01); *H04W 72/0453* (2013.01)

(58) Field of Classification Search
CPC ... H04W 48/16; H04W 52/367; H04W 16/00; H04W 48/20; H04W 72/10; H04W 84/12; H04B 17/318; H04B 7/185; H04L 45/20
See application file for complete search history.

(56) References Cited

U.S. PATENT DOCUMENTS

| | | | | |
|---|---|---|---|---|
| 2011/0096739 | A1* | 4/2011 | Heidari | H04W 72/085 370/329 |
| 2013/0035128 | A1* | 2/2013 | Chan | H04W 72/085 455/513 |
| 2015/0117228 | A1* | 4/2015 | Daub | H04W 72/082 370/252 |
| 2015/0312833 | A1* | 10/2015 | Gresset | H04W 36/20 370/329 |
| 2019/0281608 | A1* | 9/2019 | Huang | H04W 16/00 |

* cited by examiner

SYSTEMS AND METHODS FOR ALLOCATING WIRELESS CHANNEL/S TO WIRELESS ACCESS POINT/S

CROSS-REFERENCE TO RELATED APPLICATIONS

This application claims priority to Indian Patent Application No. 201821015984 filed Apr. 27, 2018, the contents of which are incorporated herein by reference in its entirety.

TECHNICAL FIELD

Embodiments of the present invention generally relate to wireless communication. In particular, embodiments of the present invention relate to a system and method for selecting and automatically allocating wireless channel/s to wireless access point/s.

BACKGROUND

This section is intended to provide information relating to general state of the art and thus any approach/functionality described herein below should not be assumed to be qualified as a prior art merely by its inclusion in this section.

At present, there are numerous wireless technologies exist for providing various communication services to users, wherein the wireless technologies may be fall in licensed segment (such as global system for mobile communications (GSM), enhanced data rates for GSM evolution (EDGE), high speed packet access (HSPA), long-term evolution (LTE), etc.) or may fall in unlicensed segment (such as Wi-Fi, unlicensed mobile access (UMA), Digital Enhanced Cordless Telecommunications (DECT), Bluetooth, Zigbee, RFID, etc.). In order to provide the communication services to the users, the wireless technologies utilize one or more wireless channels and may also share available network resources in both strata of the segments. Owing to increasing number of users availing the communication services, the use of wireless channels has grown exponentially in the recent years. Further, in order to serve the large number of users for providing the communication services, one or more wireless access points have been deployed along with the GSM/LTE cellular network. Such wireless access points provide WiFi network to serve the users through the one or more wireless channels and may also be deployed in heterogeneous networks (HetNet). These heterogeneous networks provide reliable protocols and better communications network by making the communication faster, efficient and smarter.

Further, with 802.11ac and 802.11n Wi-Fi implementation to IEEE 802.11 Standard, the users may achieve high data rates (upto gigabit) over wireless local networks. One of the main reasons behind realization of such high data rates is the use of wider channel bandwidths (such as 40 MHz, 80 MHz, 160 MHz, and 80 MHz+80 MHz) contrary to the use of conventional channel bandwidth (i.e., 20 MHz as mentioned in the IEEE Standard). Such wider channel bandwidths could be achieved via channel bonding on multiple consecutive or non-consecutive typical 20 MHz wide channels (as proposed in early IEEE Standards 802.11, 802.11a/g) available in a wireless band. The optimal bandwidth constrained wireless channel selection is particularly important for unlicensed 2.4 GHz or 5 GHz wide wireless band where the wireless access points tend to operate.

Consequently, while selecting and allocating the wireless channels for the wireless access points (compliant to 802.11ac standard), the appropriate wireless channels need to be selected for the wireless access points. In order to make use of wider channel bandwidth as specified in 802.11n and 802.11ac implementations, the existing solutions provide a static selection and configuration option to provision a fixed bandwidth mode (i.e., 160 MHz, 80 MHz, 40 MHz, or 20 MHz) to the wireless access points.

Additionally, such existing solutions encounter the following challenges: (1) the traditional network planning, deployment, and optimization have become very cumbersome as the number of access points and user devices is becoming extremely large, which makes wireless channel assignment difficult, (2) significant competition from other Wi-Fi service providers that makes wireless channel assignment more difficult as the fixed amount of channel bandwidth must be shared among multiple wireless access points, (3) the capability of user devices to establish Wi-Fi Hotspots that makes the channel bandwidth crowded and subsequently makes wireless channel selection and assignment difficult, (4) the temporary nature of the Wi-Fi Hotspots creating dynamic environment that frequently require to select a new wireless channel in order to provide the best possible service, (5) the LTE-U operating in portions of the unlicensed spectrum used by the Wi-Fi also require selection of new wireless channel, (6) other devices (such as microwave oven, Bluetooth, cordless phone) also operate within the same unlicensed spectrum that increases the level of interference and may disproportionately impact the selection of the specific wireless channels, and (7) reusing of the wireless channel in a dense Wi-Fi network often become necessary resulting in unavailability of good wireless channel.

Moreover, there are existing proprietary solutions disclosed in prior arts such as US20130195036A1, US20130035128A1 and US20100128630A1. All of these prior arts indicate that wireless channel selection is based upon an estimated quality of the available wireless channels. However, such prior arts fail to provide any details or quantifiable solutions for estimating the quality of the available wireless channels. Hence, at present, there are no solutions available for calculating the quantifiable methods for estimating the quality of the available wireless channels.

Therefore, in view of above-mentioned drawbacks present in the existing solutions, there is a need for an efficient and effective approach for evaluating the wireless channels and accordingly, selecting as well as allocating the wireless channel/s to the wireless access point/s.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for automatically allocating at least one wireless channel to at least one wireless access point, the method being performed by the at least one wireless access point, the method comprising: determining at least one candidate wireless channel, wherein each of the at least one candidate wireless channel is one of an allocated wireless channel to at least one neighboring wireless access point and an unallocated wireless channel, and each of the at least one neighboring wireless access point is present in vicinity of the at least one wireless access point; providing an initial score to each of the at least one candidate wireless channel;

determining a channel overlapping parameter for each of the at least one candidate wireless channel and a signal strength factor for each of the at least one neighbouring wireless access point, wherein the channel overlapping parameter indicates overlapping of each of the at least one candidate wireless channel with the allocated wireless channel of the at least one neighbouring wireless access point; determining a channel score for each of the at least one candidate wireless channel based on the initial score, the channel overlapping parameter, the signal strength factor and a reduction weight, wherein the reduction weight is one of a pre-defined weight and a real-time weight of the at least one candidate wireless channel; applying a positive offset to update the channel score of each of the at least one candidate wireless channel, wherein the positive offset is one of a pre-defined offset and a real-time offset; selecting the at least one wireless channel for the at least one wireless access point based on the updated channel score, wherein the at least one wireless channel is selected from the at least one candidate wireless channel; and automatically allocating the at least one wireless channel to the at least one wireless access point upon selecting the at least one wireless channel.

Embodiments of the present invention may relate to a wireless access point for automatically allocating at least one wireless channel to the at least one wireless access point, the at least one wireless access point comprising: a wireless radio interface configured to determine at least one candidate wireless channel, wherein each of the at least one candidate wireless channel is one of an allocated wireless channel to at least one neighboring wireless access point and an unallocated wireless channel, and each of the at least one neighboring wireless access point is present in vicinity of the at least one wireless access point; and a processor configured to: provide an initial score to each of the at least one candidate wireless channel; determine a channel overlapping parameter for each of the at least one candidate wireless channel and a signal strength factor for each of the at least one neighbouring wireless access point, wherein the channel overlapping parameter indicates overlapping of each of the at least one candidate wireless channel with the allocated wireless channel of the at least one neighbouring wireless access point; determine a channel score for each of the at least one candidate wireless channel based on the initial score, the channel overlapping parameter, the signal strength factor and a reduction weight, wherein the reduction weight is one of a pre-defined weight and a real-time weight of the at least one candidate wireless channel; apply a positive offset to update the channel score of each of the at least one candidate wireless channel, wherein the positive offset is one of a pre-defined offset and a real-time offset; and select the at least one wireless channel for the at least one wireless access point based on the updated channel score, wherein the at least one wireless channel is selected from the at least one candidate wireless channel; and wherein, the wireless radio interface further configured to automatically allocate the at least one wireless channel to the at least one wireless access point upon selecting the at least one wireless channel.

Embodiments of the present invention may relate to a method for automatically allocating at least one wireless channel to at least one wireless access point, the method being performed by a centralized entity, the method comprising: receiving a request from the at least one wireless access point to allocate the at least one wireless channel; receiving, from the at least one wireless access point, a signal strength value of each of at least one neighbouring wireless access point and a list of at least one candidate wireless channel, wherein each of the at least one candidate wireless channel is one of an allocated wireless channel to the at least one neighbouring wireless access point and an unallocated wireless channel, and each of the at least one neighboring wireless access point is present in vicinity of the at least one wireless access point; providing an initial score to each of the at least one candidate wireless channel; determining a channel overlapping parameter for each of the at least one candidate wireless channel, wherein the channel overlapping parameter indicates overlapping of each of the at least one candidate wireless channel with the allocated wireless channel of the at least one neighbouring wireless access point; determining a signal strength factor for each of the at least one neighbouring wireless access point based on the signal strength value; determining a channel score for each of the at least one candidate wireless channel based on the initial score, the channel overlapping parameter, the signal strength factor and a reduction weight, wherein the reduction weight is one of a pre-defined weight and a real-time weight of the at least one candidate wireless channel; applying a positive offset to update the channel score of each of the at least one candidate wireless channel, wherein the positive offset is one of a pre-defined offset and a real-time offset; selecting the at least one wireless channel for the at least one wireless access point based on the updated channel score, wherein the at least one wireless channel is selected from the at least one candidate wireless channel; and automatically allocating the at least one wireless channel to the at least one wireless access point upon selecting the at least one wireless channel.

Embodiments of the present invention may relate to a centralized entity for automatically allocating at least one wireless channel to at least one wireless access point, the centralized entity comprising: a communication interface configured to: receive a request from the at least one wireless access point to allocate the at least one wireless channel; and receive, from the at least one wireless access point, a signal strength value of each of at least one neighbouring wireless access point and a list of at least one candidate wireless channel, wherein each of the at least one candidate wireless channel is one of an allocated wireless channel to the at least one neighbouring wireless access point and an unallocated wireless channel, and each of the at least one neighboring wireless access point is present in vicinity of the at least one wireless access point; a processor configured to: provide an initial score to each of the at least one candidate wireless channel; determine a channel overlapping parameter for each of the at least one candidate wireless channel, wherein the channel overlapping parameter indicates overlapping of each of the at least one candidate wireless channel with the allocated wireless channel of the at least one neighbouring wireless access point; determine a signal strength factor for each of the at least one neighbouring wireless access point based on the signal strength value; determine a channel score for each of the at least one candidate wireless channel based on the initial score, the channel overlapping parameter, the signal strength factor and a reduction weight, wherein the reduction weight is one of a pre-defined weight and a real-time weight of the at least one candidate wireless channel; apply a positive offset to update the channel score of each of the at least one candidate wireless channel, wherein the positive offset is one of a pre-defined offset and a real-time offset; and select the at least one wireless channel for the at least one wireless access point based on the updated channel score, wherein the at least one wireless channel is selected from the at least one candidate wireless channel; and wherein, the communication interface further configured to automatically allocate the at least one wireless channel to the at least one wireless access point upon selecting the at least one wireless channel.

BRIEF DESCRIPTION OF THE DRAWINGS

The accompanying drawings, which are incorporated herein, and constitute a part of this present invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1A:
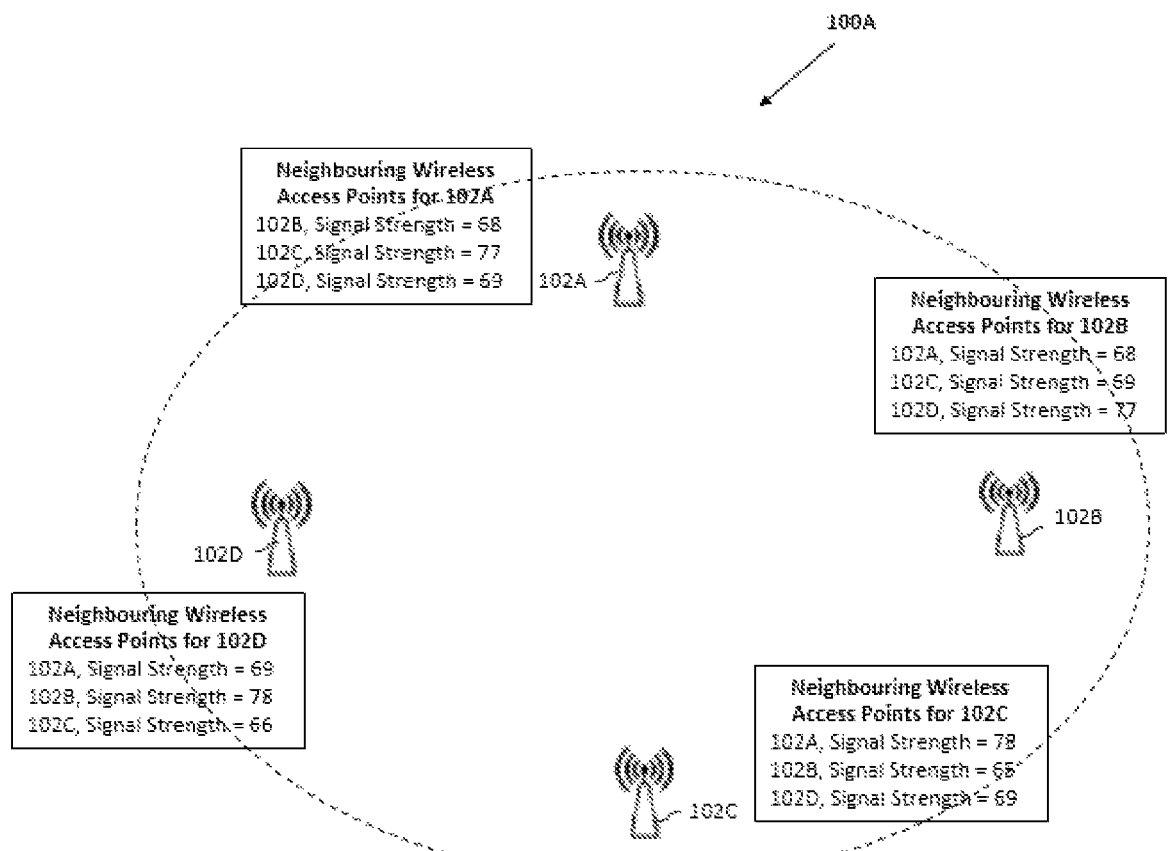
FIG. 1A illustrates a first exemplary system architecture [100A] depicting wireless access points, in accordance with an embodiment of the present invention.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses a system and a method for selecting and automatically allocating at least one wireless channel to at least one wireless access point. Further, at least one wireless access point may have at least one neighboring wireless access point, wherein the at least one neighboring wireless access point may be present in a vicinity of the at least one wireless access point.

As used herein, the at least one wireless channel may be used as a medium by the at least one wireless access point to provide at least one service to one or more users. In specific, the at least one wireless channel may be used to transmit to and receive the data/information from the one or more users. Also, a channel number may be assigned to the at least one wireless channel by a network provider and may be allocated to the at least one wireless access point for providing the at least one service (such as data service, a voice calling service, etc.) to the one or more users. Further, the at least one wireless channel may be part of a wireless band. Such wireless band may be one of a 2.4 GHz band or a 5 GHz band. Furthermore, the at least one wireless channel may be an allocated wireless channel and an unallocated wireless channel, wherein the allocated wireless channel is already allocated to at least one neighboring wireless access point and an unallocated wireless channel is not allocated to the at least one neighboring wireless access point.

As used herein, the at least one wireless access point may refer to a device that requires an allocation of the at least one wireless channel for providing the at least one service to the one or more users. In other words, the at least one wireless access point currently does not have any wireless channel and is searching for an optimal and best wireless channel. The at least one wireless access point may include, but is not limited to, a router and any such wireless access point that is obvious to a person skilled in the art.

As used herein, the at least one neighboring wireless access point may refer to a device that is present in the vicinity of the at least one wireless access point. The at least one neighboring wireless access point may interfere or overlap with coverage of the at least one wireless access point. Further, the at least one neighboring wireless access point is/are operational and providing the at least one service to the one or more users using the allocated wireless channel.

As illustrated in FIG. 1A, the present invention illustrates a first exemplary system architecture [100A] depicting four wireless access point [102A-102D] and may be neighboring wireless access points to each other. Further, as shown in the FIG. 1A, each of the wireless access points [102A-102D] may have the capability to detect at least one neighboring wireless access point and measure a signal strength value (i.e., received signal strength indication, RSSI value) of each of the at least one neighboring wireless access point. For an instance and as depicted in the exemplary system architecture [100A], a first wireless access point [102A] may detect the at least one neighboring wireless access point (e.g., a second wireless access point [102B], a third wireless access point [102C], and a fourth wireless access point [102D]) which are present in the vicinity of the first wireless access point [102A]. Thus, the first wireless access point [102A] may measure the signal strength value of each of the neighboring wireless access points, i.e., the second wireless access point [102B], the third wireless access point [102C], and the fourth wireless access point [102D]. Similarly, the second wireless access point [102B] may detect the at least one neighboring wireless access point (e.g., the first wireless access point [102A], the third wireless access point [102C], and the fourth wireless access point [102D]) which are present in the vicinity of the second wireless access point [102B]. Thus, the second wireless access point [102B] may measure the signal strength value of each of the neighboring wireless access points i.e., the first wireless access point [102A], the third wireless access point [102C], and the fourth wireless access point [102D]. Likewise, the third wireless access point [102C] may detect the at least one neighboring wireless access point (e.g., the first wireless access point [102A], the second wireless access point [102B], and the fourth wireless access point [102D]) which are present in the vicinity of the third wireless access point [102C]. Therefore, the third wireless access point [102C] may measure the signal strength value of each of the neighboring wireless access points i.e., the first wireless access point [102A], the second wireless access point [102B], and the fourth wireless access point [102D]. And lastly, the fourth wireless access point [102D] may detect the at least one neighboring wireless access point (e.g., the first wireless access point [102A], the second wireless access point [102B], and the third wireless access point [102C] which are present in the vicinity of the fourth wireless access point [102D]. Thus, the fourth wireless access point [102D] may measure the signal strength value of each of the neighboring wireless access points i.e., the first wireless access point [102A], the second wireless access point [102B], and the third wireless access point [102C].

In a first exemplary scenario, each of the at least one wireless access point [102A-102D] is already allocated with at least one wireless channel for providing at least one service to users and thus, such wireless channel may be called an allocated wireless channel. The allocated wireless channel may be part of a wireless band, wherein the wireless band may be one of a 2.4 GHz wireless band or a 5 GHz wireless band.

In a second exemplary scenario, the wireless access point [102A] does not have any allocated wireless channel and is scanning for an allocation of at least one wireless channel from at least one candidate wireless channel available in the wireless band. Each of the candidate wireless channels may have an associated channel number. Further, the at least one neighboring wireless access point [102B-102D] of the at least one wireless access point [102A] may already have the respective allocated wireless channels. In such second scenario, the at least one wireless channel from at least one candidate wireless channel may be selected and allocated to the at least one wireless access point [102A], wherein the at least one candidate wireless channel may be one of the allocated wireless channel to the at least one neighboring wireless access point [102B-102D] and an unallocated wireless channel. Such unallocated wireless channel is not allocated to any of the at least one neighboring wireless access point [102B-102D]. In this second scenario, the at least one wireless access point [102A] may select and allocate the at least one wireless channel to the at least one wireless access point [102A] which is explained in details (with respect to the second exemplary scenario) in FIG. 5 and FIG. 7.

Figure 1B:
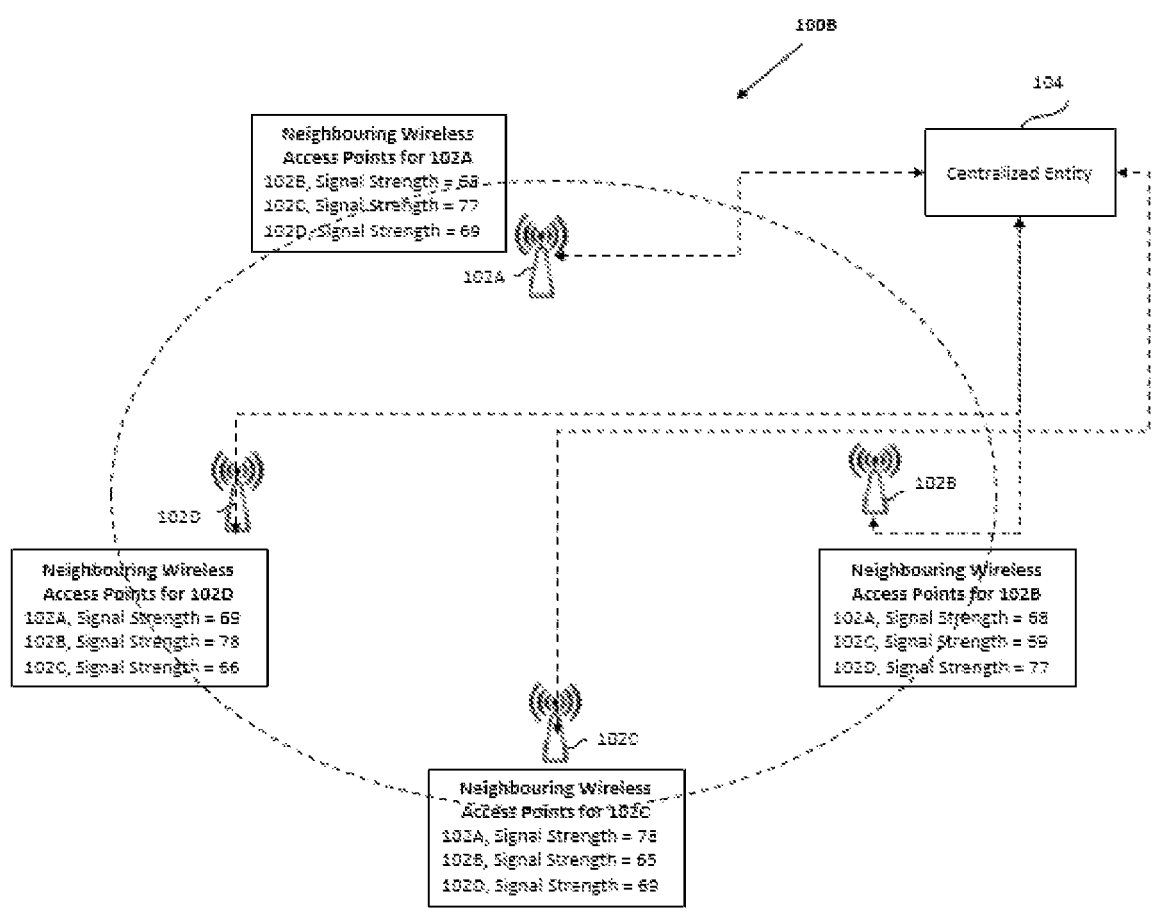
FIG. 1B illustrates a second exemplary system architecture [100B] depicting wireless access points in communication with a centralized entity, in accordance with an embodiment of the present invention.

As illustrated in FIG. 1B, the present invention illustrates a second exemplary system architecture [100B] depicting four wireless access points [102A-102D] communicatively coupled with a centralized entity [104]. According to this second exemplary system architecture [100B], each of the wireless access points [102A-102D] may detect the at least one neighboring wireless access point and measure the signal strength value of each of the at least one neighboring wireless access point. Further, with respect to the second exemplary scenario explained above in FIG. 1A where the wireless access point [102A] does not have any allocated wireless channel and is scanning for an allocation of at least one wireless channel, the at least one wireless access point [102A] may transmit a request to the centralized entity [104] for allocating the at least one wireless channel. Further, the at least one wireless access point [102A] may also transmit a list of the at least one neighboring wireless access point [102B-102D] and the signal strength value of each of the at least one neighboring wireless access point [102B-102D] to the centralized entity [104]. In such situation, the centralized entity [104] may select and allocate the at least one wireless channel to the at least one wireless access point [102A] which is explained in details (with respect to the second exemplary scenario) in FIG. 6 and FIG. 8.

Figure 2:
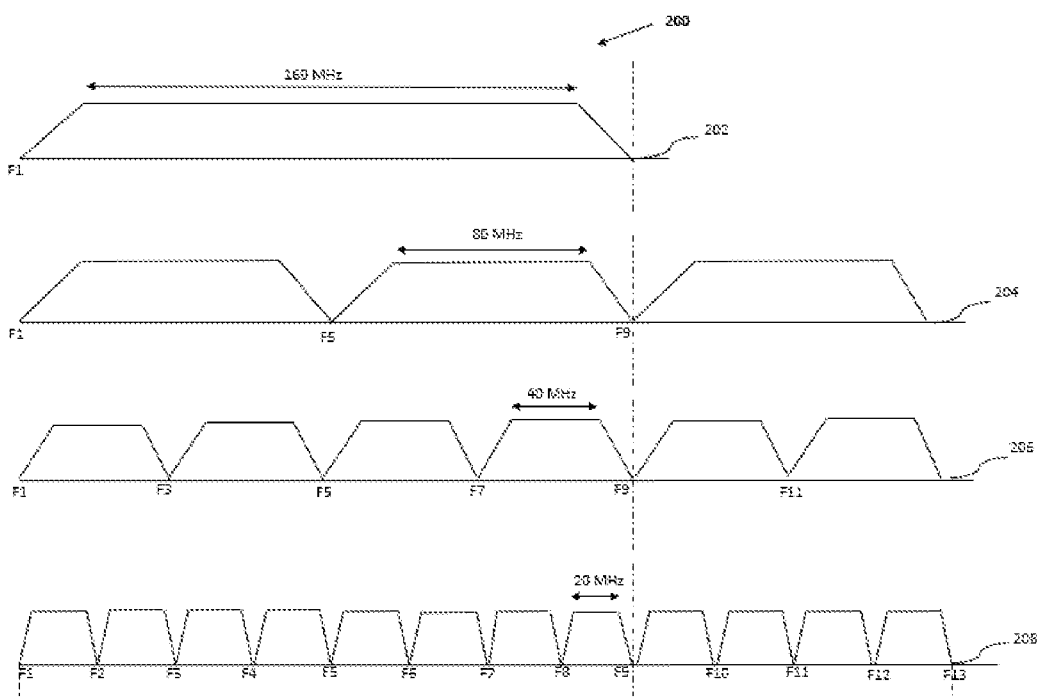
FIG. 2 illustrates an exemplary channelization scheme [200] for creating at least one candidate wireless channel in 5 GHz wireless band, in accordance with an exemplary embodiment of the present invention.

As illustrated in FIG. 2, the present invention illustrates exemplary channelization scheme [200] for creating the at least one candidate wireless channel in the 5 GHz wireless band, in accordance with an exemplary embodiment of the present invention. Such channelization scheme is specified in IEEE 802.11ac Standard. As depicted in the FIG. 2, a portion of the 5 GHz wireless band [210] may be divided to create the at least one candidate wireless channel, such creation of the at least one candidate wireless channel may be defined as per the channelization scheme proposed in the IEEE 802.11ac Standard. Further, each of the one candidate wireless channel may be uniquely identified by a starting frequency and a channel bandwidth. In a first embodiment, the 5 GHz wireless band [210] may only have one candidate wireless channel [202], wherein the candidate wireless channel [202] is 160 MHz wide starting at frequency F1, as per the 802.11ac amendment. In a second embodiment, the 5 GHz wireless band [210] may be divided into three candidate wireless channels [204], wherein each of the three candidate wireless channels [204] is 80 MHz wide, as per 802.11ac amendment, and with start frequencies F1, F5 and F9 respectively. In a third embodiment, the 5 GHz wireless band [210] may be divided into six candidate wireless channels [206], wherein each of the six candidate wireless channels [206] is 40 MHz wide (as per 802.11ac amendment), starting at frequencies F1, F3, F5, F7, F9, and F11 respectively. In a fourth embodiment, the 5 GHz wireless band [210] may be divided into twelve candidate wireless channels [208], wherein each of the twelve candidate wireless channels [208] is 20 MHz wide and starts at frequencies F1, F2, F3, F4, F5, F6, F7, F8, F9, F10, F11 and F12, respectively.

Figure 3:
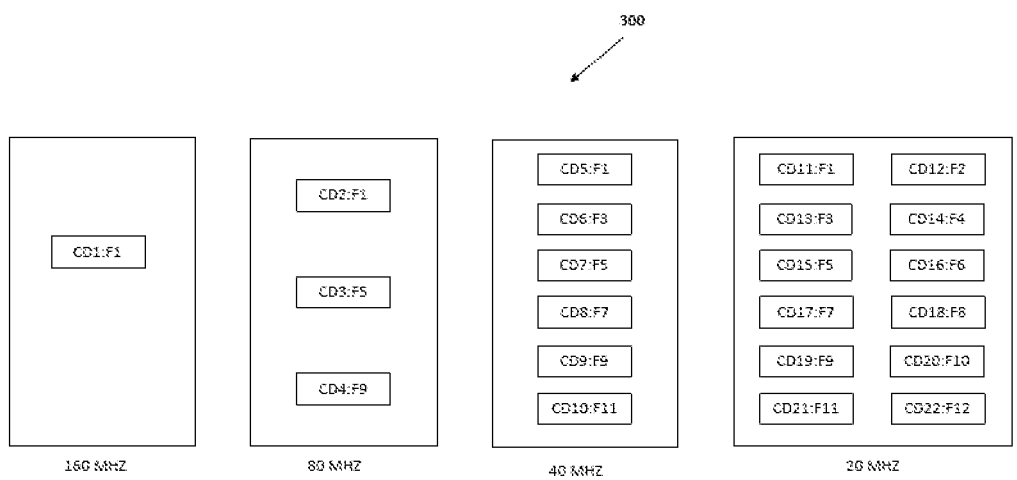
FIG. 3 illustrates an exemplary grouping of candidate wireless channels [300] based on a channelization scheme, in accordance with an embodiment of the present invention.

As illustrated in FIG. 3, the present invention illustrates an exemplary grouping of candidate wireless channels [300] based on a channelization scheme, in the 5 GHz wireless band, in accordance with an embodiment of the present invention. Such grouping of candidate wireless channels based on the channelization scheme is specified in IEEE 802.11ac Standard. Further, as depicted in FIG. 3, one or more groups may be created including the at least one candidate wireless channel, wherein the one or more groups may be created for different bandwidth. In a first embodiment, a group of 160 MHz bandwidth may be created, wherein the group may have one candidate wireless channel (CD1:F1). The candidate wireless channel may be represented by a channel designation (CD1) and a starting frequency (F1). In a second embodiment, a group of 80 MHz bandwidth may be created, wherein the group may have three candidate wireless channels (namely, CD2:F1, CD3: F5, CD4:F9). In a third embodiment, a group of 40 MHz bandwidth may be created, wherein the group may have six candidate wireless channels (namely, CD5:F1, CD6:F3, CD7:F5, CD8:F7, CD9:F9, CD10:F11). In a fourth embodiment, a group of 20 MHz bandwidth may be created, wherein the group may have twelve candidate wireless channels (namely, CD11:F1, CD12:F2, CD13:F3, CD14:F4, CD15:F5, CD16:F6, CD17:F7, CD18:F8, CD19:F9, CD20: F10, CD21:F11, CD22:F12).

Figure 4:
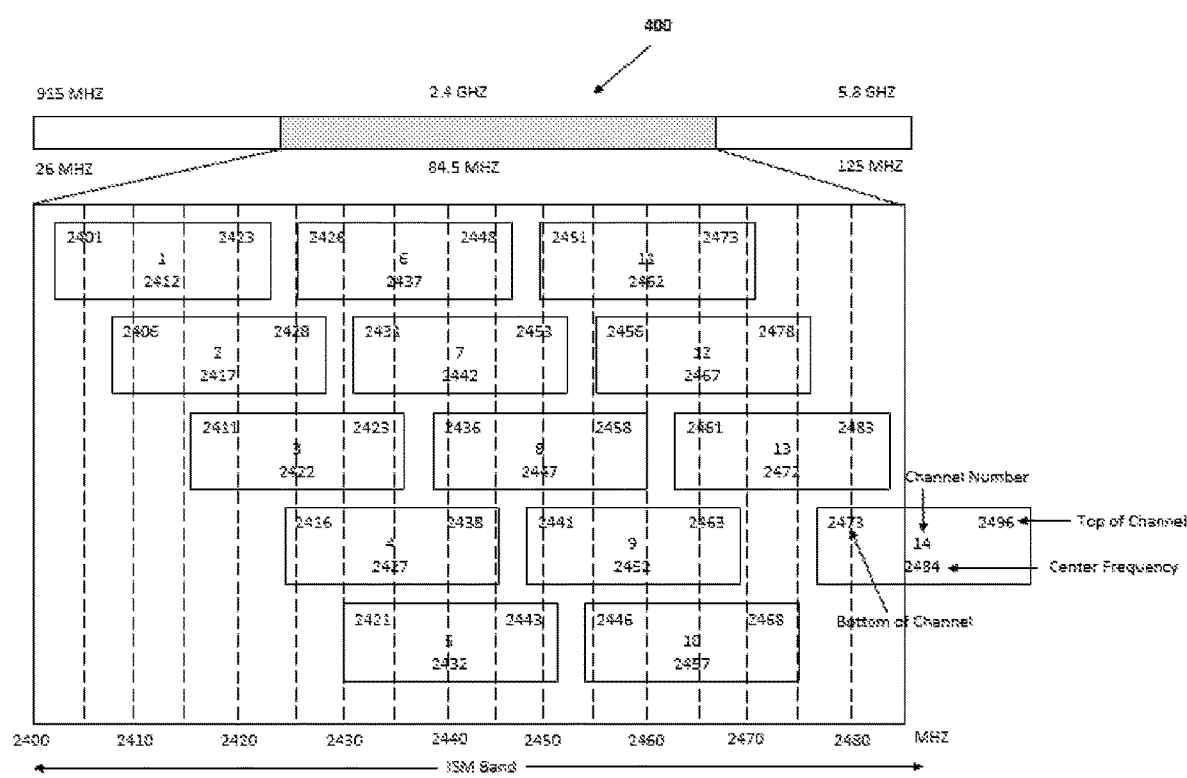
FIG. 4 illustrates an exemplary channelization scheme [400] for creating wireless channels in 2.4 GHz wireless band, in accordance with an embodiment of the present invention.

As illustrated in FIG. 4, the present invention illustrates an exemplary channelization scheme [400] for creating wireless channels in 2.4 GHz wireless band, in accordance with an embodiment of the present invention. Such channelization scheme for creating wireless channels in 2.4 GHz wireless band is specified in the IEEE 802.11ac Standard. In such channelization scheme, the 2.4 GHz wireless band has a bandwidth of 85.5 MHz and a total of fourteen candidate wireless channels may be created. Further, each of the candidate wireless channels has a channel number, a top of channel frequency, a centre channel frequency and a bottom of channel frequency. As seen in the FIG. 4, a first candidate wireless channel has 1 (one) as channel number, 2401 MHz as the top of channel frequency, 2412 MHz as the centre channel frequency and 2423 MHz as the bottom of channel frequency. Similarly, a second candidate wireless channel has 2 (two) as channel number, 2406 Hz as the top of channel frequency, 2417 MHz as the centre channel frequency and 2428 MHz as the bottom of channel frequency. Likewise, a third candidate wireless channel has 3 (three) as channel number, 2411 MHz as the top of channel frequency, 2422 MHz as the centre channel frequency and 2433 MHz as the bottom of channel frequency. A fourth candidate wireless channel has 4 (four) as channel number with 2416 MHz as the top of channel frequency, 2427 MHz as the centre channel frequency and 2438 MHz as the bottom of channel frequency. A fifth candidate wireless channel has 5 (five) as channel number, 2421 MHz as the top of channel frequency, 2432 MHz as the centre channel frequency and 2443 MHz as the bottom of channel frequency and so on.

Figure 5:
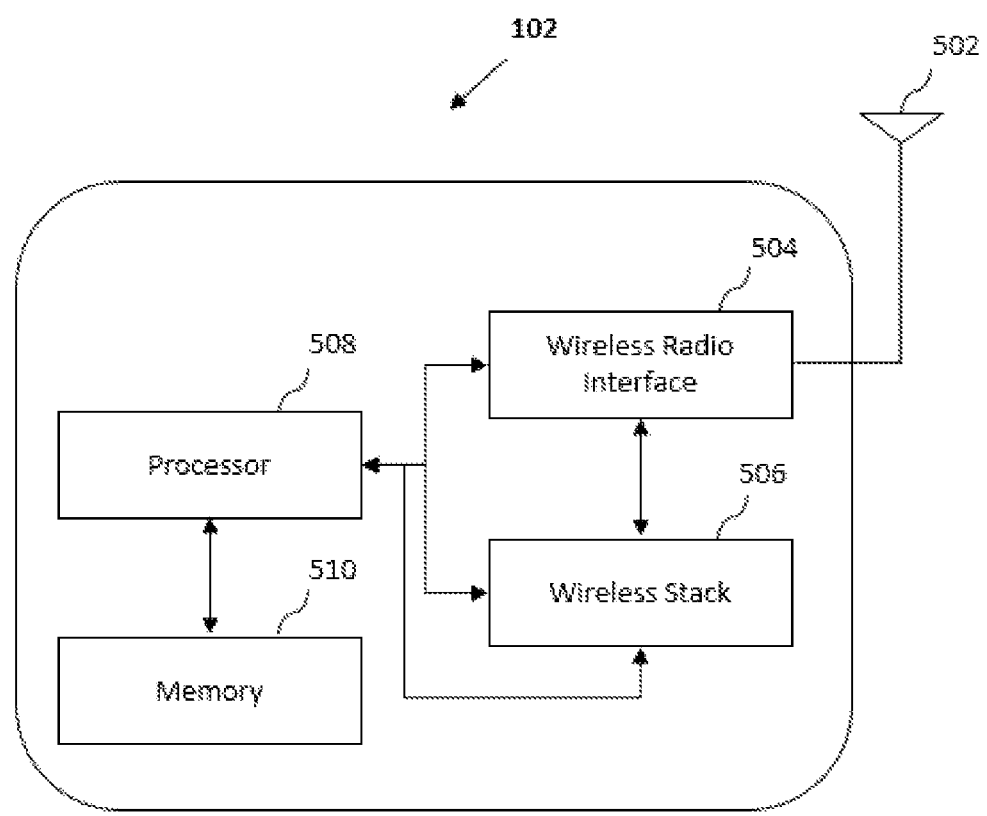
FIG. 5 illustrates an exemplary wireless access point [102] for automatically allocating wireless channel to wireless access point [102], in accordance with an embodiment of the present invention.

As illustrated in FIG. 5, the present invention illustrates an exemplary wireless access point [102] for automatically allocating wireless channel to wireless access point [102], in accordance with an embodiment of the present invention. The wireless access point [102] may include, but not limited to, an antenna [502] communicatively coupled with a wireless radio interface [504], a wireless stack [506], a processor [508] and a memory [510].

Considering the second exemplary scenario illustrated in the FIG. 1A where the wireless access point [102A] does not have any allocated wireless channel and is scanning for an allocation of at least one wireless channel from at least one candidate wireless channel present in the wireless band. In this second exemplary scenario, when the at least one wireless access point [102A] is turned on, the wireless radio interface [504] using the antenna [502] of the at least one wireless access point [102A] may determine the at least one candidate wireless channel in the wireless band. As discussed in FIG. 3, FIG. 4 and FIG. 5, the wireless band may have up to 14 candidate wireless channels and each of these candidate wireless channels is one of an allocated wireless channel to the at least one neighboring wireless access point [102B-102D] and an unallocated wireless channel. Further, each of the at least one neighboring wireless access point [102B-102D] is present in vicinity of the at least one wireless access point [102A]. Also, the wireless radio interface [504] using the antenna [502] of the at least one wireless access point [102A] may determine the signal strength value of each of the at least one neighboring wireless access point [102B-102D]. Once the wireless radio interface [504] of the at least one wireless access point [102A] may determine the at least one candidate channel in the wireless band, the processor [508] of the at least one wireless access point [102A] may provide an initial score to each of the at least one candidate wireless channel. In an embodiment, the initial score of 100 may be assigned to each of the at least one candidate wireless channel, wherein initial score of the at least one candidate wireless channel represents performance or 100% efficiency of the at least one candidate wireless channel in an ideal condition.

After assigning the initial score to each of the at least one candidate wireless channel, the processor [508] may determine a channel overlapping parameter for each of the at least one candidate wireless channel. In particular, the channel overlapping parameter indicates overlapping of each of the at least one candidate wireless channel with the allocated wireless channel of the at least one neighboring wireless access point [102B-102D]. For this, the processor [508] may calculate a channel distance between the at least one candidate wireless channel and the allocated wireless channel of the at least one neighboring wireless access point [102B-102D]. For instance, the neighboring wireless access point [102B] is providing service to users on the allocated wireless channel number 7 and the candidate channel number is 3, thus in this case, the channel distance is 4 (=7-3) between the neighboring wireless access point [102B] and the candidate channel number. Such channel distance is used to determine the channel overlapping parameter for each of the at least one candidate wireless channel which is shown in the exemplary Table 1 below:

TABLE 1

| Channel Distance | Channel Overlapping Parameter | Rationale |
| --- | --- | --- |
| 0 | 1.00000 | Complete Overlap |
| 1 | 0.77273 | 17 MHz/22 MHz Overlap |
| 2 | 0.54545 | 12 MHz/22 MHz Overlap |
| 3 | 0.31818 | 7 MHz/22 MHz Overlap |
| 4 | 0.09091 | 2 MHz/22 MHz Overlap |
| 5 or more | 0.00000 | No Overlap |

Following the same above example where the channel distance is 4 (between the allocated channel (i.e., 7) of the neighboring wireless access point [102B] and the candidate channel number (i.e., 3)), the channel overlapping parameter for the at least one candidate wireless channel (i.e., 3) is 0.09091. Each of the channel overlapping parameter for the channel distance as defined in the exemplary Table 1 may be pre-configured by a network provider. Further, each of the channel overlapping parameter may be fine-tuned anytime by the network provider. Furthermore, the processor [508] may quantify the impact of the channel overlap parameter based upon the ratio of the overlapping bandwidth (between the allocated wireless channel and the candidate channel) to a total bandwidth of the channel.

Moreover, the processor [508] may receive the signal strength value of each of the at least one neighboring wireless access point [102B-102D] from the wireless radio interface [504] and then may determine the signal strength factor for each of the at least one neighboring wireless access point [102B-102D] using the following procedure:

Consider for each case that Signal_Strength_Maximum=−50 dBm and the Signal_Strength_Minimum=−100 dBm(Preconfigured by the network operator)　　　　　　　　　　　　　　　　　　a)

If Neighboring wireless access point_Signal_Strength>Signal_Strength_Maximum, then Neighboring wireless access point_Signal_Strength=Signal_Strength_Maximum　　b)

If Neighboring wireless access point_Signal_Strength<Signal_Strength_Minimum, then Neighboring wireless access point_Signal_Strength=Signal_Strength_Minimum　　c)

Finally, the processor [508] may calculate the signal strength factor for each of the at least one neighboring wireless access point [102B-102D] as per the following formula:

Signal_Strength Factor=Neighboring wireless access point_Signal_Strength−Signal_Strength_Minimum/Signal_Strength_Maximum−Signal_Strength_Minimum　　d)

For instance, If the signal strength of neighboring wireless access point=−70 dBm, then the Signal_Strength Factor=(−70−−100)/(−50−−100)=30/50=0.6

Once the processor [508] determines the channel overlap parameter and the signal strength factor, the processor [508] may determine a channel score for each of the at least one candidate wireless channels based on the initial score, the channel overlapping parameter, the signal strength factor and a reduction weight. Further, the reduction weight is one of a pre-defined weight and a real-time weight of the at least one candidate wireless channel. In one embodiment, the reduction weight is configurable constant factor of 0.90. In specific, the following formula may be used to determine the channel score:

Channel Score={Initial Score*[1−(Reduction Weight*Channel Overlap Parameter*Signal_Strength Factor)]}, wherein [1−(Reduction Weight*Channel Overlap Parameter*Signal_Strength Factor)] is called as Reduction Factor.

The concept of using reduction weight while calculating the channel score has two the following purposes: 1) to provide the ability to tune the aggressiveness of the channel score; and 2) to ensure that the channel score cannot ever be zero, which is important in a very dense wireless access points deployment (i.e., when all candidate wireless channels are being allocated to the wireless access points and when there is a necessity of choosing the "least bad" wireless channel for allocating this channel to the at least one wireless access point).

After the processor [508] determines the channel score for each of the at least one candidate wireless channel, the processor [508] may apply a positive offset to update the channel score of each of the at least one candidate wireless channel, wherein the positive offset is one of a pre-defined offset and a real-time offset. Such positive offset or channel affinity may be a configurable offset that can be configured by the network provider. Further, the positive offset or channel affinity may provide bias to the at least one candidate wireless channel and may help in selecting an optimal at least one wireless channel for the at least one wireless access point [102A]. Further, the positive offset may be applied to the at least one candidate wireless channel in a following pattern, wherein wireless channels 1-7-13 come under 3-Channel pattern. Similarly, wireless channels 1-5-9-13 come under 4-Channel pattern, wireless channels 1-4-7-10-13 come under 5-Channel pattern, wireless channels 1-3-6-8-11-13 10 come under 6-Channel pattern and wireless channels 1-3-5-7-9-11-13 come under 7-Channel pattern. The network provider may pre-configure the positive offset or the channel affinity for each of the at least one candidate wireless channel as provided in the exemplary Table 2 below.

TABLE 2

| Candidate Wireless Channel Number | Positive Offset/ Channel Affinity | Rationale |
| --- | --- | --- |
| 1 | 7 | Channel 1 & 13 are best |
| 2 | 0 | |
| 3 | 2 | |
| 4 | 4 | |
| 5 | 5 | Channel 5 is part of 1-5-9-13 pattern |
| 6 | 1 | |
| 7 | 6 | Channel 7 is next best |
| 8 | 1 | |
| 9 | 5 | Channel 5 is part of 1-5-9-13 pattern |
| 10 | 4 | |
| 11 | 2 | |
| 12 | 0 | |
| 13 | 7 | Channel 1 & 13 are best |
| 14 | 3 | Channel 14 not available in India but is included here for sake of completeness |

In accordance with the above exemplary Table 2 above, the value to be applied in the channel score for each of the at least one candidate wireless channel may be updated in the following manner:

Value to be updated in the Channel Score=Positive Offset/Channel Affinity of the candidate wireless channel/1000

For an instance, for channel number 1, the value to be updated in the Channel Score may be considered as 7/1000, which is 0.0007. Likewise, for channel number 7, the value to be updated in the Channel Score may be considered as 6/1000, which is 0.0006.

Lastly, the processor [508] may select the at least one wireless channel for the at least one wireless access point [102A] based on the updated channel score, wherein the at least one wireless channel is selected from the at least one candidate wireless channel. In one embodiment, the candidate wireless channel with a highest updated channel score may be selected. In other embodiment, the candidate wireless channel with a second highest updated channel score may be selected for the at least one wireless access point [102A]. This is done to ensure selecting the at least one wireless channel that may not selected in future or near future by any other wireless access points.

The processor [508] may communicate to the wireless radio interface [504] for allocating the selected wireless channel to the at least one wireless access point [102A]. In turn, the wireless radio interface [504] may automatically allocate the selected wireless channel to the at least one wireless access point [102A].

After the wireless radio interface [504] automatically allocate the selected wireless channel to the at least one wireless access point [102A], the wireless radio interface [504], in communication with the wireless stack [506], may be configured to provide services to the users through the antenna [502].

The processor [508] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [510], coupled to the processor [508], may be configured to store and manage multiple data sets including the channel overlap parameters for channel distance, the maximum signal strength, the minimum signal strength, the positive offset for each channel, etc. The memory [510] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 6:
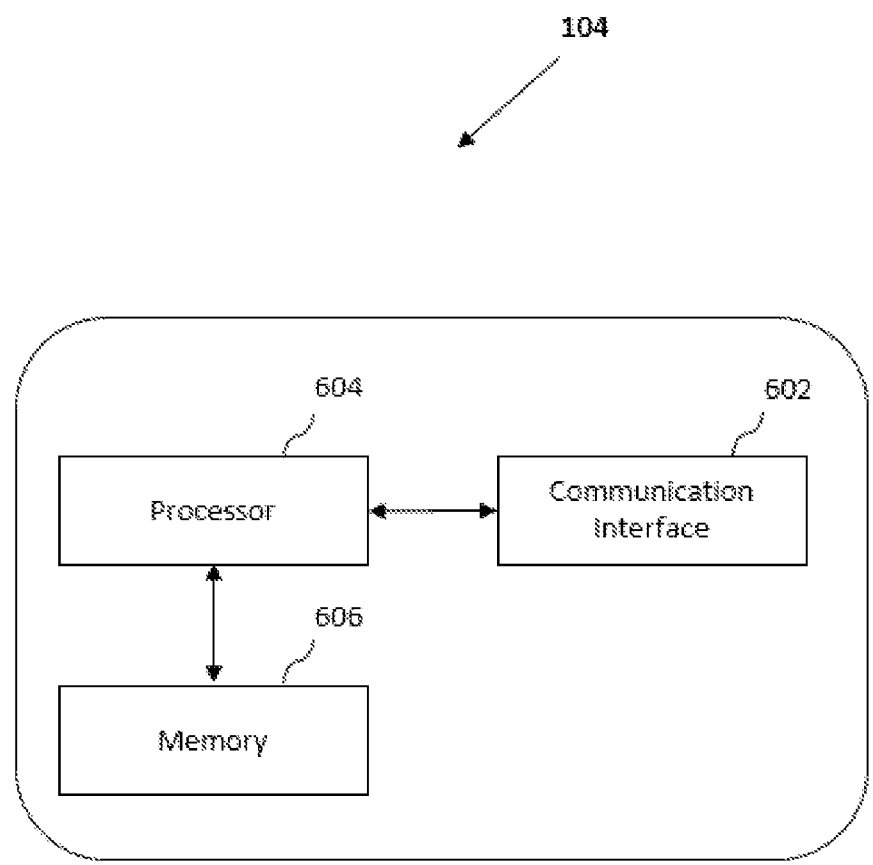
FIG. 6 illustrates an exemplary centralized entity [104] for automatically allocating wireless channel to wireless access point [102], in accordance with an embodiment of the present invention.

As illustrated in FIG. 6, the present invention illustrates an exemplary centralized entity [104] for automatically allocating wireless channel to wireless access point [102], in accordance with an embodiment of the present invention. The centralized entity [104] may include, but is not limited to, a communication interface [602], a processor [604] and a memory [606].

Considering the second exemplary scenario illustrated in the FIG. 1B where the wireless access point [102A] does not have any allocated wireless channel and is scanning for an allocation of at least one wireless channel from at least one candidate wireless channel available in one of a 2.4 GHz wireless band and a 5 GHz wireless band. In this second exemplary scenario, when the at least one wireless access point [102] is turned on, the wireless radio interface [504] using the antenna [502] of the at least one wireless access point [102A] may determine the at least one candidate wireless channel in the wireless band. As discussed in FIG. 3, FIG. 4 and FIG. 5, the wireless band may have up to 14 candidate wireless channels and each of these candidate wireless channels is one of the allocated wireless channel to the at least one neighboring wireless access point [102B-102D] and the unallocated wireless channel. Further, each of the at least one neighboring wireless access point [102B-102D] is present in vicinity of the at least one wireless access point [102A]. Also, the wireless radio interface [504] using the antenna [502] of the at least one wireless access point [102A] may determine the signal strength value of each of the at least one neighboring wireless access point [102B-102D].

Once the wireless radio interface [504] may determine the at least one candidate channel and the signal strength value, the wireless radio interface [504] of the at least one wireless access point [102A] may transmit a request to the communication interface [602] of the centralized entity [104] for allocating the at least one wireless channel. Further, the wireless radio interface [504] of the at least one wireless access point [102A] may also transmit the signal strength value of each of at least one neighboring wireless access point and a list of at least one candidate wireless channel to the communication interface [602] of the centralized entity [104].

On receiving the request, the signal strength value and the list of the at least one candidate wireless channel from the wireless radio interface [504] of the at least one wireless access point [102A], the communication interface [602] of the centralized entity [104] may transmit such information to the processor [604].

The processor [604] of the centralized entity [104] may provide an initial score to each of the at least one candidate wireless channel. In an embodiment, the initial score of 100 may be assigned to each of the at least one candidate wireless channel, wherein initial score of the at least one candidate wireless channel represents performance or 100% efficiency of the at least one candidate wireless channel in an ideal condition.

After assigning the initial score to each of the at least one candidate wireless channel, the processor [604] of the centralized entity [104] may determine a channel overlapping parameter for each of the at least one candidate wireless channel. In particular, the channel overlapping parameter indicates overlapping of each of the at least one candidate wireless channel with the allocated wireless channel of the at least one neighboring wireless access point [102B-102D]. For this, the processor [604] may calculate a channel distance between the at least one candidate wireless channel and the allocated wireless channel of the at least one neighboring wireless access point [102B-102D]. For instance, the neighboring wireless access point [102B] is providing service to users on the allocated wireless channel number 7 and the candidate channel number is 3, thus in this case, the channel distance is 4 (=7-3) between the neighboring wireless access point [102B] and the candidate channel number. Such channel distance is determined as per the exemplary Table 1 explained above in FIG. 5.

Further, the processor [604] may receive the signal strength value of each of the at least one neighboring wireless access point [102B-102D] and then, may determine the signal strength factor for each of the at least one neighboring wireless access point [102B-102D] using the same procedure explained above in FIG. 5 and the formula below.

$$\text{Signal\_Strength Factor} = (\text{Neighboring wireless access point\_Signal\_Strength} - \text{Signal\_Strength\_Minimum}) / (\text{Signal\_Strength\_Maximum} - \text{Signal\_Strength\_Minimum})$$

Once the processor [604] determines the channel overlap parameter and the signal strength factor, the processor [604] may determine a channel score for each of the at least one candidate wireless channel based on the initial score, the channel overlapping parameter, the signal strength factor and a reduction weight. Further, the reduction weight is one of a pre-defined weight and a real-time weight of the at least one candidate wireless channel. In one embodiment, the reduction weight is configurable constant factor of 0.90. In specific, the following formula may be used to determine the channel score:

$$\text{Channel Score} = \{\text{Initial Score} * [1 - (\text{Reduction Weight} * \text{Channel Overlap Parameter} * \text{Signal\_Strength Factor})]\},$$

wherein [1−(Reduction Weight*Channel Overlap Parameter*Signal_Strength Factor)] is called as the Reduction Factor.

After the processor [604] determines the channel score for each of the at least one candidate wireless channel, the processor [604] may apply a positive offset to update the channel score of each of the at least one candidate wireless channel, wherein the positive offset is one of a pre-defined offset and a real-time offset. Such positive offset or channel affinity may be a configurable offset that can be configured by the service provider. Further, the positive offset or channel affinity may provide bias to the at least one candidate wireless channel and may help in selecting an optimal at least one wireless channel for the at least one wireless access point [102A]. Further, the positive offset may be applied to the at least one candidate wireless channel in a following pattern, wherein wireless channels 1-7-13 come under 3-Channel pattern. Similarly, wireless channels 1-5-9-13 come under 4-Channel pattern, wireless channels 1-4-7-10-13 come under 5-Channel pattern, wireless channels 1-3-6-8-11-13 10 come under 6-Channel pattern and wireless channels 1-3-5-7-9-11-13 come under 7-Channel pattern. The network provider may pre-configure the positive offset or the channel affinity for each of the at least one candidate wireless channel as provided in the exemplary Table 2 above in FIG. 5.

Lastly, the processor [604] may select the at least one wireless channel for the at least one wireless access point [102A] based on the updated channel score, wherein the at least one wireless channel is selected from the at least one candidate wireless channel. In one embodiment, the candidate wireless channel with a highest updated channel score may be selected. In other embodiment, the candidate wireless channel with a second highest updated channel score may be selected for the at least one wireless access point [102A]. This is done to ensure selecting the at least one wireless channel that may not selected in future by any other wireless access points.

The processor [604] may communicate to the communication interface [602] for allocating the selected wireless channel to the at least one wireless access point [102A]. In turn, the communication interface [602] may automatically allocate the selected wireless channel to the at least one wireless access point [102A].

After the communication interface [602] automatically allocates the selected wireless channel to the at least one wireless access point [102A].

The processor [604] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [606], coupled to the processor [604], may be configured to store and manage multiple data sets including the channel over parameter for channel distance, the maximum signal strength, the minimum signal strength, the positive offset for each channel, etc. The memory [606] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 7:
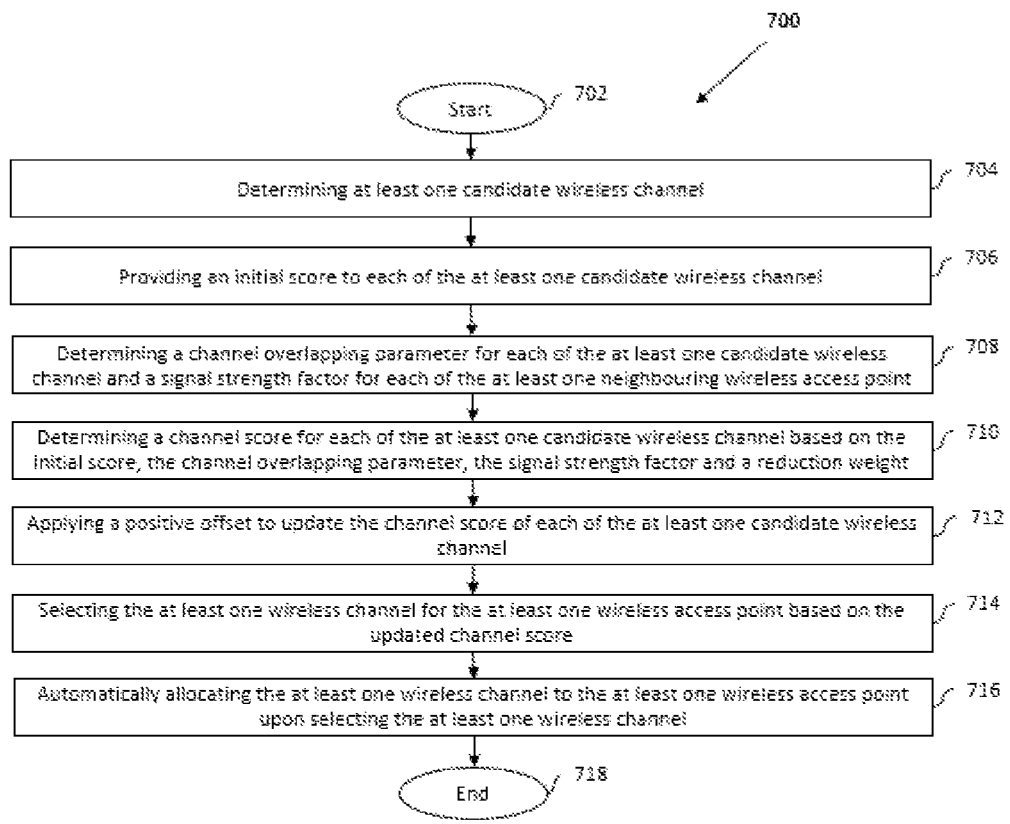
FIG. 7 illustrates an exemplary method flow diagram [700] for automatically allocating wireless channel to wireless access point [102] by the wireless access point [102], in accordance with an embodiment of the present invention.

As illustrated in FIG. 7, the present invention illustrates an exemplary method flow diagram [700] for automatically allocating wireless channel to wireless access point [102], in accordance with an embodiment of the present invention, wherein the method being performed by the wireless access point [102]. The method flow initiates at step 702.

At step 704, considering the second exemplary scenario illustrated in the FIG. 1A, when the at least one wireless access point [102] is turned on, the wireless radio interface [504] using the antenna [502] of the at least one wireless access point [102A] may determine the at least one candidate wireless channel in the wireless band.

At step 706, the processor [508] of the at least one wireless access point [102A] may provide an initial score to each of the at least one candidate wireless channel. In an embodiment, the initial score of 100 may be assigned to each of the at least one candidate wireless channel, wherein initial score of the at least one candidate wireless channel represents performance or 100% efficiency of the at least one candidate wireless channel in an ideal condition.

At step 708, the processor [508] may determine a channel overlapping parameter for each of the at least one candidate wireless channel. In particular, the channel overlapping parameter indicates overlapping of each of the at least one candidate wireless channel with the allocated wireless channel of the at least one neighboring wireless access point [102B-102D]. For this, the processor [508] may calculate a channel distance between the at least one candidate wireless channel and the allocated wireless channel of the at least one neighboring wireless access point [102B-102D]. Further, the processor [508] may receive the signal strength value of each of the at least one neighboring wireless access point [102B-102D] from the wireless radio interface [504] and then may determine the signal strength factor for each of the at least one neighboring wireless access point [102B-102D] using the procedures explained in FIG. 5.

At step 710, the processor [508] may determine a channel score for each of the at least one candidate wireless channel based on the initial score, the channel overlapping parameter, the signal strength factor and a reduction weight. Further, the reduction weight is one of a pre-defined weight and a real-time weight of the at least one candidate wireless channel. In one embodiment, the reduction weight is configurable constant factor of 0.90. In specific, the following formula may be used to determine the channel score:

Channel Score={Initial Score*[1−(Reduction Weight*Channel Overlap Parameter*Signal_Strength Factor)]}, wherein [1−(Reduction Weight*Channel Overlap Parameter*Signal_Strength Factor)] called as Reduction Factor.

At step 712, the processor [508] may apply a positive offset to update the channel score of each of the at least one candidate wireless channel, wherein the positive offset is one of a pre-defined offset and a real-time offset. Such positive offset or channel affinity may be a configurable offset that can be configured by the service provider. The positive offset may be applied to each of the candidate wireless channel as explained in the exemplary Table 2 in FIG. 5.

At step 714, the processor [508] may select the at least one wireless channel for the at least one wireless access point [102A] based on the updated channel score, wherein the at least one wireless channel is selected from the at least one candidate wireless channel. In one embodiment, the candidate wireless channel with a highest updated channel score may be selected. In other embodiment, the candidate wireless channel with a second highest updated channel score may be selected for the at least one wireless access point

[102A]. This is done to ensure selecting the at least one wireless channel that may not selected in future by any other wireless access points.

At step 716, the processor [508] may communicate to the wireless radio interface [504] for allocating the selected wireless channel to the at least one wireless access point [102A]. In turn, the wireless radio interface [504] may automatically allocate the selected wireless channel to the at least one wireless access point [102A]. Then, the method [700] may end at step 718.

Figure 8:
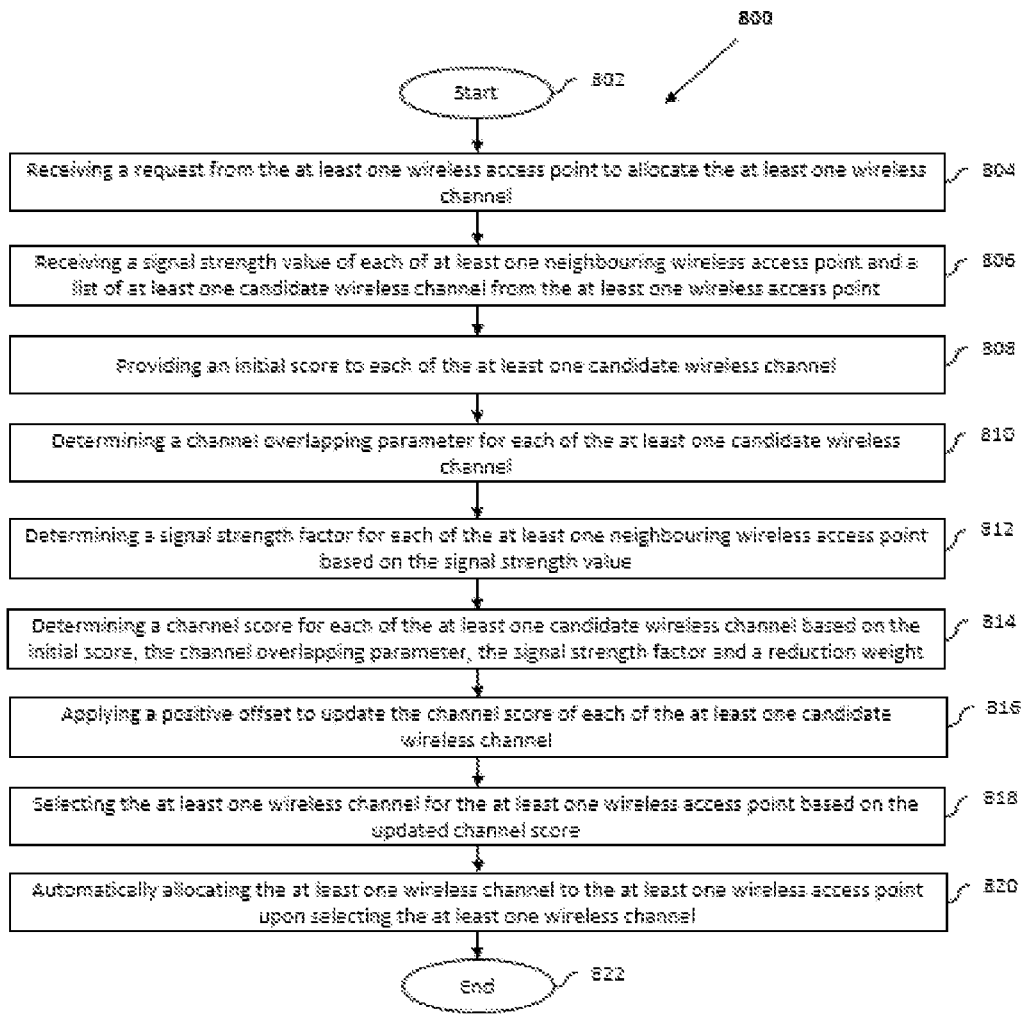
FIG. 8 illustrates an exemplary method flow diagram [800] for automatically allocating wireless channel to wireless access point [102] by the centralized entity [106], in accordance with an embodiment of the present invention.

As illustrated in FIG. 8, the present invention illustrates an exemplary method flow diagram [800] for automatically allocating wireless channel to wireless access point [102], in accordance with an embodiment of the present invention, wherein the method being performed by the centralized entity [104]. The method flow initiates at step 802.

At step 804, considering the second exemplary scenario illustrated in the FIG. 1B, the communication interface [602] of the centralized entity [104] may receive a request from the wireless radio interface [504] of the at least one wireless access point [102A] for allocating the at least one wireless channel.

At step 806, the communication interface [602] of the centralized entity [104] may receive the signal strength value of each of at least one neighboring wireless access point and the list of at least one candidate wireless channel from the wireless radio interface [504] of the at least one wireless access point [102A].

At step 808, the processor [604] of the centralized entity [104] may provide an initial score to each of the at least one candidate wireless channel. In an embodiment, the initial score of 100 may be assigned to each of the at least one candidate wireless channel, wherein initial score of the at least one candidate wireless channel represents performance or 100% efficiency of the at least one candidate wireless channel in an ideal condition.

At step 810, the processor [604] of the centralized entity [104] may determine a channel overlapping parameter for each of the at least one candidate wireless channel. In particular, the channel overlapping parameter indicates overlapping of each of the at least one candidate wireless channel with the allocated wireless channel of the at least one neighboring wireless access point [102B-102D]. For this, the processor [604] may calculate a channel distance between the at least one candidate wireless channel and the allocated wireless channel of the at least one neighboring wireless access point [102B-102D]. For instance, the neighboring wireless access point [102B] is providing service to users on the allocated wireless channel number 7 and the candidate channel number is 3, thus in this case, the channel distance is 4 (=7-3) between the neighboring wireless access point [102B] and the candidate channel number. Such channel distance is determined as per the exemplary Table 1 explained above in FIG. 5.

At step 812, the processor [604] may receive the signal strength value of each of the at least one neighboring wireless access point [102B-102D] and then, may determine the signal strength factor for each of the at least one neighboring wireless access point [102B-102D] using the same procedure explained above in FIG. 5.

At step 814, the processor [604] may determine a channel score for each of the at least one candidate wireless channel based on the initial score, the channel overlapping parameter, the signal strength factor and a reduction weight.

Further, the reduction weight is one of a pre-defined weight and a real-time weight of the at least one candidate wireless channel. In one embodiment, the reduction weight is configurable constant factor of 0.90. In specific, the following formula may be used to determine the channel score:

Channel Score={Initial Score*[1−(Reduction Weight*Channel Overlap Parameter*Signal_Strength Factor)]}, wherein [1−(Reduction Weight*Channel Overlap Parameter*Signal_Strength Factor)] called as Reduction Factor.

At step 816, the processor [604] may apply a positive offset to update the channel score of each of the at least one candidate wireless channel, wherein the positive offset is one of a pre-defined offset and a real-time offset. Such positive offset or channel affinity may be a configurable offset that can be configured by the service provider. Further, the positive offset or channel affinity may provide bias to the at least one candidate wireless channel and may help in selecting an optimal at least one wireless channel for the at least one wireless access point [102A]. Further, the positive offset may be provided in the exemplary Table 2 above in FIG. 5.

At step 818, the processor [604] may select the at least one wireless channel for the at least one wireless access point [102A] based on the updated channel score, wherein the at least one wireless channel is selected from the at least one candidate wireless channel. In one embodiment, the candidate wireless channel with a highest updated channel score may be selected. In other embodiment, the candidate wireless channel with a second highest updated channel score may be selected for the at least one wireless access point [102A]. This is done to ensure selecting the at least one wireless channel that may not selected in future by any other wireless access points.

At step 820, the communication interface [602] may automatically allocate the selected wireless channel to the at least one wireless access point [102A]. Then, the method [800] may end at step 822.

The present invention encompasses normalization of the channel score, wherein all three parameters (such as the reduction weight, the channel overlap parameter and the signal strength factor) in the channel score normalized (i.e., the parameters contain a value between 0 and 1). Thus, resultant product of these three parameters is also normalized. Since the resultant product cannot be greater than one, the channel score cannot increase. Since the reduction weight is less than one, the channel score cannot become zero. Such normalization of the channel score ensures that all the candidate wireless channels are evaluated consistently (especially under dense network conditions).

The present invention facilitates allocating and selecting the at least one wireless channel to the at least one wireless access point [102] based on updated channel score after applying the positive offset to each of the candidate channel. Few examples of selecting the at least one wireless channel to the at least one wireless access point [102] based on updated channel score are provided hereinbelow. The exemplary Table 3 provided below depicts that the candidate wireless channel 13 has been selected for the at least one wireless access point [102A] as the candidate wireless channel has the highest updated channel score of 100.007 than any other candidate wireless channels.

EXEMPLARY TABLE 3

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | Candidate Wireless Channel | 1 | 2 | 3 | 4 | 5 | 6 | 7 |
|---|---|---|---|---|---|---|---|---|---|---|
| 1 | −60 | 0.800 | Initial Score | 100 | 100 | 100 | 100 | 100 | 100 | 100 |
| | | | Channel Overlap Parameter | 1.000 | 0.773 | 0.545 | 0.318 | 0.091 | 0.000 | 0.000 |
| | | | Reduction Factor | 0.280 | 0.444 | 0.607 | 0.771 | 0.935 | 1.000 | 1.000 |
| | | | Channel Score | 28.000 | 44.364 | 60.727 | 77.091 | 93.455 | 100.000 | 100.000 |
| | | | Updated Channel Score after Positive Offset | 28.007 | 44.364 | 60.729 | 77.095 | 93.460 | 100.001 | 100.006 |

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | Candidate Wireless Channel | 8 | 9 | 10 | 11 | 12 | 13 |
|---|---|---|---|---|---|---|---|---|---|
| 1 | −60 | 0.800 | Initial Score | 100 | 100 | 100 | 100 | 100 | 100 |
| | | | Channel Overlap Parameter | 0.000 | 0.000 | 0.000 | 0.000 | 0.000 | 0.000 |
| | | | Reduction Factor | 1.000 | 1.000 | 1.000 | 1.000 | 1.000 | 1.000 |
| | | | Channel Score | 100.000 | 100.000 | 100.000 | 100.000 | 100.000 | 100.000 |
| | | | Updated Channel Score after Positive Offset | 100.001 | 100.005 | 100.004 | 100.002 | 100.000 | 100.007 |

The exemplary Table 4 provided below depicts that any of the candidate wireless channel 13 or the candidate wireless channel 1 may be selected for the at least one wireless access point [102A] as these candidate wireless channels have the highest updated channel score of 100.007 than any other candidate wireless channels.

EXEMPLARY TABLE 4

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | Candidate Wireless Channel | 1 | 2 | 3 | 4 | 5 | 6 | 7 |
|---|---|---|---|---|---|---|---|---|---|---|
| 7 | −60 | 0.800 | Initial Score | 100 | 100 | 100 | 100 | 100 | 100 | 100 |
| | | | Channel Overlap Parameter | 0.000 | 0.000 | 0.091 | 0.318 | 0.545 | 0.773 | 1.000 |
| | | | Reduction Factor | 1.000 | 1.000 | 0.935 | 0.771 | 0.607 | 0.444 | 0.280 |
| | | | Channel Score | 100.000 | 100.000 | 93.455 | 77.091 | 60.727 | 44.364 | 28.000 |

EXEMPLARY TABLE 4-continued

|  |  |  | Updated Channel Score after Positive Offset | 100.007 | 100.000 | 93.457 | 77.095 | 60.732 | 44.365 | 28.006 |
|---|---|---|---|---|---|---|---|---|---|---|

| Signal Strength_Min | Signal Strength_Max | Reduction Weight |
|---|---|---|
| −100 | −50 | 0.9 |

| Neighbor Channel | Neighbor Signal Strength | Signal Strength Factor | | | | | | | |
|---|---|---|---|---|---|---|---|---|---|
|  |  |  | Candidate Wireless Channel | 8 | 9 | 10 | 11 | 12 | 13 |
|  |  |  | Initial Score | 100 | 100 | 100 | 100 | 100 | 100 |
| 7 | −60 | 0.800 | Channel Overlap Parameter | 0.773 | 0.545 | 0.318 | 0.091 | 0.000 | 0.000 |
|  |  |  | Reduction Factor | 0.444 | 0.607 | 0.771 | 0.935 | 1.000 | 1.000 |
|  |  |  | Channel Score | 44.364 | 60.727 | 77.091 | 93.455 | 100.000 | 100.000 |
|  |  |  | Updated Channel Score after Positive Offset | 44.365 | 60.732 | 77.095 | 93.457 | 100.000 | 100.007 |

The exemplary Table 5 provided below depicts that the candidate wireless channel 7 has been selected for the at least one wireless access point [102A] as the candidate wireless channel 7 has the highest updated channel score of 100.006 than any other candidate wireless channels.

EXEMPLARY TABLE 5

| Signal Strength_Min | Signal Strength_Max | Reduction Weight |
|---|---|---|
| −100 | −50 | 0.9 |

| Neighbor Channel | Neighbor Signal Strength | Signal Strength Factor | | | | | | | |
|---|---|---|---|---|---|---|---|---|---|
|  |  |  | Candidate Wireless Channel | 1 | 2 | 3 | 4 | 5 | 6 | 7 |
|  |  |  | Initial Score | 100 | 100 | 100 | 100 | 100 | 100 | 100 |
| 1 | −60 | 0.800 | Channel Overlap Parameter | 1.000 | 0.773 | 0.545 | 0.318 | 0.091 | 0.000 | 0.000 |
|  |  |  | Reduction Factor | 0.280 | 0.444 | 0.607 | 0.771 | 0.935 | 1.000 | 1.000 |
|  |  |  | Channel Score | 28.000 | 44.364 | 60.727 | 77.091 | 93.455 | 100.000 | 100.000 |
| 13 | −70 | 0.600 | Channel Overlap Parameter | 0.000 | 0.000 | 0.000 | 0.000 | 0.000 | 0.000 | 0.000 |
|  |  |  | Reduction Factor | 1.000 | 1.000 | 1.000 | 1.000 | 1.000 | 1.000 | 1.000 |
|  |  |  | Channel Score | 28.000 | 44.364 | 60.727 | 77.091 | 93.455 | 100.000 | 100.000 |
|  |  |  | Channel Updated Score after Positive Offset | 28.007 | 44.364 | 60.729 | 77.095 | 93.460 | 100.001 | 100.006 |

EXEMPLARY TABLE 5-continued

| Signal Strength_Min | Signal Strength_Max | Reduction Weight | | | | | | | |
|---|---|---|---|---|---|---|---|---|---|
| −100 | −50 | 0.9 | | | | | | | |

| | | | Candidate Wireless Channel | 8 | 9 | 10 | 11 | 12 | 13 |
|---|---|---|---|---|---|---|---|---|---|
| Neighbor Channel | Neighbor Signal Strength | Signal Strength Factor | Initial Score | 100 | 100 | 100 | 100 | 100 | 100 |
| 1 | −60 | 0.800 | Channel Overlap Parameter | 0.000 | 0.000 | 0.000 | 0.000 | 0.000 | 0.000 |
| | | | Reduction Factor | 1.000 | 1.000 | 1.000 | 1.000 | 1.000 | 1.000 |
| | | | Channel Score | 100.000 | 100.000 | 100.000 | 100.000 | 100.000 | 100.000 |
| 13 | −70 | 0.600 | Channel Overlap Parameter | 0.000 | 0.091 | 0.318 | 0.545 | 0.773 | 1.000 |
| | | | Reduction Factor | 1.000 | 0.951 | 0.828 | 0.705 | 0.583 | 0.460 |
| | | | Channel Score | 100.00 | 95.091 | 82.818 | 70.545 | 58.273 | 46.000 |
| | | | Channel Updated Score after Positive Offset | 100.001 | 95.096 | 82.822 | 70.547 | 58.273 | 46.007 |

The exemplary Table 5 provided below depicts that the candidate wireless channel 7 has been selected for the at least one wireless access point [102A] as the candidate wireless channel 7 has the highest updated channel score of 95.097 than any other candidate wireless channels.

EXEMPLARY TABLE 6

| Signal Strength_Min | Signal Strength_Max | Reduction Weight | | | | | | | |
|---|---|---|---|---|---|---|---|---|---|
| −100 | −50 | 0.9 | | | | | | | |

| | | | Candidate Wireless Channel | 1 | 2 | 3 | 4 | 5 | 6 | 7 |
|---|---|---|---|---|---|---|---|---|---|---|
| Neighbor Channel | Neighbor Signal Strength | Signal Strength Factor | Initial Score | 100 | 100 | 100 | 100 | 100 | 100 | 100 |
| 2 | −60 | 0.800 | Channel Overlap Parameter | 0.773 | 1.000 | 0.773 | 0.545 | 0.318 | 0.091 | 0.000 |
| | | | Reduction Factor | 0.444 | 0.280 | 0.444 | 0.607 | 0.771 | 0.935 | 1.000 |
| | | | Channel Score | 44.364 | 28.000 | 44.364 | 60.727 | 77.091 | 93.455 | 100.000 |
| 11 | −70 | 0.600 | Channel Overlap Parameter | 0.000 | 0.000 | 0.000 | 0.000 | 0.000 | 0.000 | 0.091 |
| | | | Reduction Factor | 1.000 | 1.000 | 1.000 | 1.000 | 1.000 | 1.000 | 0.951 |
| | | | Channel Score | 44.364 | 28.000 | 44.364 | 60.727 | 77.091 | 93.455 | 95.091 |
| | | | Updated Channel Score after Positive Offset | 44.371 | 28.007 | 44.366 | 60.731 | 77.096 | 93.456 | 95.097 |

EXEMPLARY TABLE 6-continued

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | | | | | | | |
|---|---|---|---|---|---|---|---|---|---|
| | | | Candidate Wireless Channel | 8 | 9 | 10 | 11 | 12 | 13 |
| | | | Initial Score | 100 | 100 | 100 | 100 | 100 | 100 |
| 2 | −60 | 0.800 | Channel Overlap Parameter | 0.000 | 0.000 | 0.000 | 0.000 | 0.000 | 0.000 |
| | | | Reduction Factor | 1.000 | 1.000 | 1.000 | 1.000 | 1.000 | 1.000 |
| | | | Channel Score | 100.000 | 100.000 | 100.000 | 100.000 | 100.000 | 100.000 |
| 11 | −70 | 0.600 | Channel Overlap Parameter | 0.318 | 0.545 | 0.773 | 1.00 | 0.773 | 0.545 |
| | | | Reduction Factor | 0.828 | 0.705 | 0.583 | 0.460 | 0.583 | 0.705 |
| | | | Channel Score | 82.818 | 70.545 | 58.273 | 46.000 | 58.273 | 70.545 |
| | | | Updated Channel Score after Positive Offset | 82.819 | 70.550 | 58.277 | 46.002 | 58.273 | 70.552 |

The exemplary Table 7 provided below depicts that the candidate wireless channel 5 has been selected for the at least one wireless access point [102A] as the candidate wireless channel 5 has the highest updated channel score of 93.460 than any other candidate wireless channels.

EXEMPLARY TABLE 7

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | | | | | | | |
|---|---|---|---|---|---|---|---|---|---|
| | | | Candidate Wireless Channel | 1 | 2 | 3 | 4 | 5 | 6 | 7 |
| | | | Initial Score | 100 | 100 | 100 | 100 | 100 | 100 | 100 |
| 10 | −60 | 0.800 | Channel Overlap Parameter | 0.000 | 0.000 | 0.000 | 0.000 | 0.00 | 0.091 | 0.318 |
| | | | Reduction Factor | 1.00 | 1.00 | 1.00 | 1.00 | 1.00 | 0.935 | 0.771 |
| | | | Channel Score | 100.00 | 100.00 | 100.00 | 100.00 | 100.00 | 93.455 | 77.091 |
| 1 | −60 | 0.800 | Channel Overlap Parameter | 1.000 | 0.773 | 0.545 | 0.318 | 0.091 | 0.000 | 0.000 |
| | | | Reduction Factor | 0.280 | 0.444 | 0.607 | 0.771 | 0.935 | 1.000 | 1.000 |
| | | | Channel Score | 28.000 | 44.364 | 60.727 | 77.091 | 93.455 | 93.455 | 77.091 |
| 13 | −60 | 0.800 | Channel Overlap Parameter | 0.000 | 0.000 | 0.000 | 0.000 | 0.000 | 0.000 | 0.000 |
| | | | Reduction Factor | 1.000 | 1.000 | 1.000 | 1.000 | 1.000 | 1.000 | 1.000 |

EXEMPLARY TABLE 7-continued

| | | | | | | | | | |
|---|---|---|---|---|---|---|---|---|---|
| | | | Channel Score | 28.000 | 44.364 | 60.727 | 77.091 | 93.455 | 93.455 | 77.091 |
| | | | Updated Channel Score after Positive Offset | 28.007 | 44.364 | 60.729 | 77.095 | 93.460 | 93.456 | 77.097 |

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | Candidate Wireless Channel | 8 | 9 | 10 | 11 | 12 | 13 |
|---|---|---|---|---|---|---|---|---|---|
| | | | Initial Score | 100 | 100 | 100 | 100 | 100 | 100 |
| 10 | −60 | 0.800 | Channel Overlap Parameter | 0.545 | 0.773 | 1.000 | 0.773 | 0.545 | 0.318 |
| | | | Reduction Factor | 0.607 | 0.444 | 0.280 | 0.444 | 0.607 | 0.771 |
| | | | Channel Score | 60.727 | 44.364 | 28.000 | 44.364 | 60.727 | 77.091 |
| 1 | −60 | 0.800 | Channel Overlap Parameter | 0.000 | 0.000 | 0.000 | 0.000 | 0.000 | 0.000 |
| | | | Reduction Factor | 1.000 | 1.000 | 1.000 | 1.000 | 1.000 | 1.000 |
| | | | Channel Score | 60.727 | 44.364 | 28.000 | 44.364 | 60.727 | 77.091 |
| 13 | −60 | 0.800 | Channel Overlap Parameter | 0.000 | 0.091 | 0.318 | 0.545 | 0.773 | 1.00 |
| | | | Reduction Factor | 1.000 | 0.935 | 0.771 | 0.607 | 0.444 | 0.280 |
| | | | Channel Score | 60.727 | 41.460 | 21.585 | 26.941 | 26.941 | 21.585 |
| | | | Updated Channel Score after Positive Offset | 60.728 | 41.465 | 21.589 | 26.943 | 26.941 | 21.592 |

The exemplary Table 8 provided below depicts that the candidate wireless channel 7 has been selected for the at least one wireless access point [102A] as the candidate wireless channel 7 has the highest updated channel score of 53.650 than any other candidate wireless channels.

EXEMPLARY TABLE 8

| Signal Strength_Min | Signal Strength_Max | Reduction Weight | | | | | | | |
|---|---|---|---|---|---|---|---|---|---|
| −100 | −50 | 0.9 | | | | | | | |

| Neighbor Channel | Neighbor Signal Strength | Signal Strength Factor | Candidate Wireless Channel | 1 | 2 | 3 | 4 | 5 | 6 | 7 |
|---|---|---|---|---|---|---|---|---|---|---|
| | | | Initial Score | 100 | 100 | 100 | 100 | 100 | 100 | 100 |
| 2 | −60 | 0.800 | Channel Overlap Parameter | 0.773 | 1.000 | 0.773 | 0.545 | 0.318 | 0.091 | 0.000 |
| | | | Reduction Factor | 0.444 | 0.280 | 0.444 | 0.607 | 0.771 | 0.935 | 1.000 |
| | | | Channel Score | 44.364 | 28.000 | 44.364 | 60.727 | 77.091 | 93.455 | 100.00 |

EXEMPLARY TABLE 8-continued

| | | | | | | | | | |
|---|---|---|---|---|---|---|---|---|---|
| 11 | −50 | 1.000 | Channel Overlap Parameter | 0.000 | 0.000 | 0.000 | 0.000 | 0.000 | 0.000 | 0.091 |
| | | | Reduction Factor | 1.000 | 1.000 | 1.000 | 1.000 | 1.000 | 1.000 | 0.918 |
| | | | Channel Score | 44.364 | 28.000 | 44.364 | 60.727 | 77.091 | 93.455 | 91.818 |
| 5 | −70 | 0.600 | Channel Overlap Parameter | 0.091 | 0.318 | 0.545 | 0.773 | 1.00 | 0.773 | 0.545 |
| | | | Reduction Factor | 0.951 | 0.828 | 0.705 | 0.583 | 0.460 | 0.583 | 0.705 |
| | | | Channel Score | 42.186 | 23.189 | 31.297 | 35.387 | 35.462 | 54.459 | 64.774 |
| 10 | −70 | 0.600 | Channel Overlap Parameter | 0.000 | 0.000 | 0.000 | 0.000 | 0.000 | 0.091 | 0.318 |
| | | | Reduction Factor | 1.000 | 1.000 | 1.000 | 1.000 | 1.000 | 0.951 | 0.828 |
| | | | Channel Score | 42.186 | 23.189 | 31.297 | 35.387 | 35.462 | 51.785 | 53.644 |
| | | | Updated Channel Score after Positive Offset | 42.193 | 23.189 | 31.299 | 35.391 | 35.467 | 51.786 | 53.650 |

| Signal Strength_Min | Signal Strength_Max | Reduction Weight |
|---|---|---|
| −100 | −50 | 0.9 |

| Neighbor Channel | Neighbor Signal Strength | Signal Strength Factor | | Candidate Wireless Channel | 8 | 9 | 10 | 11 | 12 | 13 |
|---|---|---|---|---|---|---|---|---|---|---|
| | | | | Initial Score | 100 | 100 | 100 | 100 | 100 | 100 |
| 2 | −60 | 0.800 | Channel Overlap Parameter | | 0.000 | 0.000 | 0.000 | 0.000 | 0.000 | 0.000 |
| | | | Reduction Factor | | 1.000 | 1.000 | 1.000 | 1.000 | 1.000 | 1.000 |
| | | | Channel Score | | 100.00 | 100.00 | 100.00 | 100.00 | 100.00 | 100.00 |
| 11 | −50 | 1.000 | Channel Overlap Parameter | | 0.318 | 0.545 | 0.773 | 1.000 | 0.773 | 0.545 |
| | | | Reduction Factor | | 0.714 | 0.509 | 0.305 | 0.100 | 0.305 | 0.509 |
| | | | Channel Score | | 71.364 | 50.909 | 30.455 | 10.000 | 30.455 | 50.909 |
| 5 | −70 | 0.600 | Channel Overlap Parameter | | 0.318 | 0.091 | 0.000 | 0.000 | 0.000 | 0.000 |
| | | | Reduction Factor | | 0.828 | 0.951 | 1.000 | 1.000 | 1.000 | 1.000 |
| | | | Channel Score | | 59.102 | 48.410 | 30.455 | 10.00 | 30.455 | 50.909 |
| 10 | −70 | 0.600 | Channel Overlap Parameter | | 0.545 | 0.773 | 1.000 | 0.773 | 0.545 | 0.318 |
| | | | Reduction Factor | | 0.705 | 0.583 | 0.460 | 0.583 | 0.705 | 0.828 |
| | | | Channel Score | | 41.694 | 28.210 | 14.009 | 5.827 | 21.484 | 42.162 |
| | | | Updated Channel Score after Positive Offset | | 41.695 | 28.215 | 14.013 | 5.829 | 21.484 | 42.169 |

The exemplary Table 9 provided below depicts exemplary dBm, mW and signal strength factor values.

EXEMPLARY TABLE 9

| bBm | Signal Strength Factor | mW | Signal Strength Factor |
|---|---|---|---|
| −50 | 1.0000 | 1.00E−05 | 1.0000 |
| −55 | 0.9000 | 3.16E−06 | 0.3162 |
| −60 | 0.8000 | 1.00E−06 | 0.1000 |
| −65 | 0.7000 | 3.16E−07 | 0.0316 |
| −70 | 0.6000 | 1.00E−07 | 0.0100 |
| −75 | 0.5000 | 3.16E−08 | 0.0032 |
| −80 | 0.4000 | 1.00E−08 | 0.0010 |
| −85 | 0.3000 | 3.16E−09 | 0.0003 |
| −90 | 0.2000 | 1.00E−09 | 0.0001 |
| −95 | 0.1000 | 3.16E−10 | 0.0000 |
| −100 | 0.0000 | 1.00E−10 | 0.0000 |

The primary objective of the present invention is to minimize wireless channel adjacency/overlap with the allocated wireless channels of the neighboring wireless access points [102B-102D] while selecting the wireless channel for the at least one wireless access point [102A]. Further, providing the positive offset or channel affinity may also be helpful for effectively breaking channel score ties and providing a small bias (affinity) toward the preferred wireless channels. Furthermore, the positive offset or channel affinity mechanism optimizes wireless channel selection by maximizing channel spacing during initial selection, and minimizing the necessity for wireless channel reselection (during future channel optimization).

The present invention further facilitates that methods [700/800] as described herein may be implemented in all of the following embodiments.

1) Initial Channel Selection (ICS)
  a. As a component of the wireless access point [102] commissioning
B. Periodic Channel Selection (PCS)
  a. Evaluate radio environment at a configurable schedule
C. Dynamic Channel Selection (DCS)
  a. Regular evaluation of the list of neighbouring access points and/or performance statistics (KPIs)
  b. Detect channel conflict and/or degradation of radio conditions 101031 c. Trigger channel reselection and reconfigure AP to optimal channel The iterative execution of the methods (e.g., PCS, DCS) enables the wireless access point [102] to react to changes in the dynamic wireless network.

The present invention provides the following technical advantages over the existing approaches: 1) providing positive offset toward the candidate wireless channels for minimizing the probability that the at least one wireless access point [102A] may need to reselect the wireless channel in future, 2) using normalized channel overlap parameter i.e., normalized measure of the impact due to wireless channel overlap that enables direct calculation of wireless channel viability with one or more other normalized factors, c) using normalized signal strength factor i.e., normalized measure of the impact due to measured signal strength of the neighbouring access points [102B-102D] which enables direct calculation of channel viability with one or more other normalized factors, and d) evaluation using normalized factors i.e., performing computation that yields a consistent, numerical indication of wireless channel quality, which can be used to optimize wireless channel selection.

Although, the present invention has been described with respect to the second exemplary scenario, where the at least one wireless access point [102A] searches for an allocation of the at least one wireless channel and the three neighboring wireless access points [102B-102D] are present in the vicinity of the wireless access point [102A]; however, it will be appreciated by those skilled in the art that the any wireless access point may search for an allocation of the at least one wireless channel and may have any number of neighboring wireless access points and all such scenarios and embodiments shall be encompassed by the present invention.

The units, interfaces, modules, and components depicted in the figures and described herein may be present in the form of a hardware, a software and a combination thereof. Connection/s shown between these the wireless access point [102A], the neighboring wireless access points [102B-102D], and the centralized entity [104], any other units, components, modules and interfaces in the exemplary system architecture [100A & 100B], may interact with each other through various logical links and/or physical links. Further, the wireless access point [102A], the neighboring wireless access points [102B-102D], and the centralized entity [104], any other units, components, modules and interfaces may be connected in other possible ways.

Though a limited number of the wireless access point [102A], the neighboring wireless access points [102B-102D], and the centralized entity [104], any other units, components, modules and interfaces have been shown in the figures; however, it will be appreciated by those skilled in the art that the exemplary system architecture [100] of the present invention encompasses any number and varied types of the entities/elements such the wireless access point [102A], the neighboring wireless access points [102B-102D], and the centralized entity [104], any other units, components, modules and interfaces.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for automatically allocating at least one wireless channel to at least one wireless access point, the method being performed by the at least one wireless access point, the method comprising:

determining at least one of candidate wireless channels, wherein
each of the at least one of candidate wireless channels is one of an allocated wireless channel to at least one of neighbouring wireless access points and an unallocated wireless channel, and
each of the at least one of neighbouring wireless access points is present in vicinity of the at least one wireless access point;
assigning a channel efficiency score to each of the at least one of candidate wireless channels that indicates an ideal wireless performance;
determining a channel overlapping parameter for each of the at least one of candidate wireless channels and a signal strength factor for each of the at least one of neighbouring wireless access points, wherein the channel overlapping parameter indicates overlapping of each of the at least one of candidate wireless channels with the allocated wireless channel of the at least one of neighbouring wireless access points based on evaluating a distance between neighbouring wireless access points;

determining a candidate channel score for each of the at least one of candidate wireless channels by applying the channel overlapping parameter, the signal strength factor and a reduction weight to the channel efficiency score, wherein the reduction weight is one of a predefined weight and a real-time weight of the at least one of candidate wireless channels, and the signal strength factor is determined by evaluating a signal strength of the at least one of neighbouring access points received from a wireless radio interface;

applying a positive offset to determine an updated channel score of each of the at least one of candidate wireless channels, wherein the positive offset is one of a predefined offset and a real-time offset;

selecting the at least one wireless channel for the at least one wireless access point based on the updated channel score, wherein the at least one wireless channel is selected from the at least one of candidate wireless channels; and automatically allocating the at least one wireless channel to the at least one wireless access point upon selecting the at least one wireless channel.

2. The method as claimed in claim 1, further comprising, determining the channel overlapping parameter based on a channel distance between the at least one candidate wireless channel and the allocated wireless channel of the at least one neighbouring wireless access point.

3. The method as claimed in claim 1, further comprising, determining the signal strength factor based on a maximum signal strength, a minimum signal strength, and a signal strength value of each of the at least one neighbouring wireless access point.

4. The method as claimed in claim 3, further comprising, determining the signal strength value of each of the at least one neighbouring wireless access point.

5. The method as claimed in claim 1, wherein the at least one candidate wireless channel is part of one of a 2.4 GHz wireless band and a 5 GHz wireless band.

6. The method as claimed in claim 1, wherein the initial channel efficiency score represents performance of the at least one candidate wireless channel in an ideal condition.

7. The method as claimed in claim 1, wherein the positive offset represents bias toward the at least one candidate wireless channel.

8. A wireless access point for automatically allocating at least one wireless channel to the wireless access point, the wireless access point comprising:

a wireless radio interface configured to determine at least one of candidate wireless channels, wherein each of the at least one of candidate wireless channels is one of an allocated wireless channel to at least one of neighboring neighbouring wireless access points and an unallocated wireless channel, and each of the at least one of neighbouring wireless access points is present in vicinity of the wireless access point; and a processor configured to:

assign a channel efficiency score to each of the at least one of candidate wireless channels that indicates an ideal wireless performance;

determine a channel overlapping parameter for each of the at least one of candidate wireless channels and a signal strength factor for each of the at least one of neighbouring wireless access points, wherein the channel overlapping parameter indicates overlapping of each of the at least one of candidate wireless channels with the allocated wireless channel of the at least one of neighbouring wireless access points based on evaluating a distance between neighbouring wireless access points;

determine a candidate channel score for each of the at least one of candidate wireless channels by applying the channel overlapping parameter, the signal strength factor and a reduction weight to the channel efficiency score, wherein the reduction weight is one of a predefined weight and a real-time weight of the at least one of candidate wireless channels, and the signal strength factor is determined by evaluating a signal strength of the at least one of neighbouring access points received from a wireless radio interface;

apply a positive offset to determine an updated channel score of each of the at least one of candidate wireless channels, wherein the positive offset is one of a predefined offset and a real-time offset; and select the at least one wireless channel for the wireless access point based on the updated channel score, wherein the at least one wireless channel is selected from the at least one of candidate wireless channels; and wherein, the wireless radio interface is further configured to automatically allocate the at least one wireless channel to the wireless access point upon selecting the at least one wireless channel.

9. A method for automatically allocating at least one of wireless channels to at least one of wireless access points, the method being performed by a centralized entity, the method comprising:

receiving a request from the at least one of wireless access points to allocate the at least one of wireless channels;

receiving, from the at least one of wireless access points, a signal strength value of each of at least one of neighbouring wireless access points and a list of at least one of candidate wireless channels, wherein each of the at least one of candidate wireless channels is one of an allocated wireless channel to the at least one of neighbouring wireless access points and an unallocated wireless channel, and each of the at least one of neighbouring wireless access points is present in vicinity of the at least one of wireless access points;

assigning an initial channel efficiency score to each of the at least one of candidate wireless channels that indicates an ideal wireless performance;

determining a channel overlapping parameter for each of the at least one of candidate wireless channels, wherein the channel overlapping parameter indicates overlapping of each of the at least one of candidate wireless channels with the allocated wireless channel of the at least one of neighbouring wireless access points based on evaluating a distance between neighbouring wireless access points;

determining a signal strength factor for each of the at least one of neighbouring wireless access points based on the signal strength value;

determining a candidate channel score for each of the at least one of candidate wireless channels by applying the channel overlapping parameter, the signal strength factor and a reduction weight to the channel efficiency score, wherein the reduction weight is one of a predefined weight and a real-time weight of the at least one of candidate wireless channels;

applying a positive offset to determine an updated channel score of each of the at least one of candidate wireless channels, wherein the positive offset is one of a predefined offset and a real-time offset;

selecting the at least one of wireless channels for the at least one of wireless access points based on the updated channel score, wherein the at least one of wireless channels is selected from the at least one of candidate wireless channels; and automatically allocating the at least one of wireless channels to the at least one of wireless access points upon selecting the at least one of wireless channels.

10. The method as claimed in claim 9, further comprising, determining the channel overlapping parameter based on a channel distance between the at least one candidate wireless channel and the allocated wireless channel of the at least one neighbouring wireless access point.

11. The method as claimed in claim 1, further comprising, determining the signal strength factor based on a maximum signal strength parameter, a minimum signal strength parameter, and a signal strength value of each of the at least one neighbouring wireless access point.

12. The method as claimed in claim 11, further comprising, determining the signal strength value of each of the at least one neighbouring wireless access point.

13. The method as claimed in claim 11, wherein the at least one candidate wireless channel is part of one of a 2.4 GHz wireless band and a 5 GHz wireless band.

14. The method as claimed in claim 11, wherein the channel efficiency score represents performance of the at least one candidate wireless channel in an ideal condition.

15. The method as claimed in claim 11, wherein the positive offset represents bias toward the at least one candidate wireless channel.

16. A centralized entity for automatically allocating at least one wireless channel to at least one wireless access point, the centralized entity comprising:

a communication interface configured to:
receive a request from the at least one wireless access point to allocate the at least one wireless channel; and
receive, from the at least one wireless access point, a signal strength value of each of at least one of neighbouring wireless access points and a list of at least one of candidate wireless channels, wherein each of the at least one of candidate wireless channels is one of an allocated wireless channel to the at least one of neighbouring wireless access points and an unallocated wireless channel, and each of the at least one of neighbouring wireless access points is present in vicinity of the at least one wireless access point;

a processor configured to:

assign a channel efficiency score to each of the at least one of candidate wireless channels that indicates an ideal wireless performance;

determine a channel overlapping parameter for each of the at least one of candidate wireless channels, wherein the channel overlapping parameter indicates overlapping of each of the at least one of candidate wireless channels with the allocated wireless channel of the at least one of neighbouring wireless access points based on evaluating a distance between neighbouring wireless access points;

determine a signal strength factor for each of the at least one of neighbouring wireless access points based on the signal strength value;

determine a candidate channel score for each of the at least one of candidate wireless channels by applying the channel overlapping parameter, the signal strength factor and a reduction weight to the channel efficiency score, wherein the reduction weight is one of a predefined weight and a real-time weight of the at least one of candidate wireless channels;

apply a positive offset to determine an updated channel score of each of the at least one of candidate wireless channels, wherein the positive offset is one of a predefined offset and a real-time offset; and select the at least one wireless channel for the at least one wireless access point based on the updated channel score, wherein the at least one wireless channel is selected from the at least one of candidate wireless channels; and wherein, the communication interface is further configured to automatically allocate the at least one wireless channel to the at least one wireless access point upon selecting the at least one wireless channel.

* * * * *